(12) United States Patent
Duke et al.

(10) Patent No.: US 11,195,007 B2
(45) Date of Patent: Dec. 7, 2021

(54) CLASSIFICATION OF PIPING AND INSTRUMENTAL DIAGRAM INFORMATION USING MACHINE-LEARNING

(71) Applicant: CHEVRON U.S.A. INC., San Ramon, CA (US)

(72) Inventors: Paul Duke, Houston, TX (US); Shuxing Cheng, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 170 days.

(21) Appl. No.: 16/376,827

(22) Filed: Apr. 5, 2019

(65) Prior Publication Data
US 2019/0236352 A1    Aug. 1, 2019

Related U.S. Application Data

(63) Continuation of application No. 16/131,946, filed on Sep. 14, 2018.
(Continued)

(51) Int. Cl.
*G06K 9/00* (2006.01)
*G06N 3/08* (2006.01)
(Continued)

(52) U.S. Cl.
CPC ..... *G06K 9/00476* (2013.01); *G06K 9/00456* (2013.01); *G06K 9/6218* (2013.01);
(Continued)

(58) Field of Classification Search
CPC .......... G06K 9/00476; G06K 9/00456; G06K 9/6271; G06K 9/6272
See application file for complete search history.

(56) References Cited

U.S. PATENT DOCUMENTS 5,251,268 A    10/1993 Colley et al.
8,830,241 B1    9/2014 Gorner
(Continued)

FOREIGN PATENT DOCUMENTS

EP    3104302 A1    12/2016

OTHER PUBLICATIONS

International Search Report and Written Opinion dated Nov. 7, 2019 for International Application No. PCT/US2019/026072, filed Apr. 5, 2019.

(Continued)

*Primary Examiner* — Wen W Huang
(74) *Attorney, Agent, or Firm* — Sheppard, Mullin, Richter & Hampton LLP

(57) ABSTRACT

Systems and methods for identifying patterns of symbols in standardized system diagrams are disclosed. Disclosed implementations obtain or synthetically generate a symbol recognition training data set including multiple training images, generate a symbol recognition model based on the symbol recognition training data set, obtain an image comprising a pattern of symbols, group symbols into process loops based on the logical relationships captured by process loop identification algorithm, apply a character classification model to image contours to identify the characters and group characters into tags via hierarchical clustering, and store the identified tags, symbols and identified process loops in a relational database.

49 Claims, 26 Drawing Sheets

Related U.S. Application Data

(60) Provisional application No. 62/558,383, filed on Sep. 14, 2017, provisional application No. 62/653,193, filed on Apr. 5, 2018.

(51) Int. Cl.
| | |
|---|---|
| *G06N 3/04* | (2006.01) |
| *G06K 9/62* | (2006.01) |
| *G06N 20/10* | (2019.01) |
| *G06N 5/00* | (2006.01) |
| *G06N 20/20* | (2019.01) |

(52) U.S. Cl.
CPC ......... *G06K 9/6256* (2013.01); *G06K 9/6262* (2013.01); *G06K 9/6271* (2013.01); *G06N 3/04* (2013.01); *G06N 3/0454* (2013.01); *G06N 3/08* (2013.01); *G06K 2209/01* (2013.01); *G06N 5/003* (2013.01); *G06N 20/10* (2019.01); *G06N 20/20* (2019.01)

(56) References Cited

U.S. PATENT DOCUMENTS

| | | | |
|---|---|---|---|
| 9,483,701 | B1 | 11/2016 | Kwatra et al. |
| 10,423,827 | B1 | 9/2019 | Wu et al. |
| 2003/0123721 | A1 | 7/2003 | Megiddo et al. |
| 2003/0236661 | A1* | 12/2003 | Burges ................. G06K 9/6232 704/205 |
| 2010/0250622 | A1* | 9/2010 | Hossenlop .......... G06K 9/00476 707/803 |
| 2011/0052062 | A1 | 3/2011 | Chiu et al. |
| 2014/0241634 | A1 | 8/2014 | Dhua et al. |
| 2015/0161301 | A1* | 6/2015 | Begur ................... G06F 30/327 716/105 |
| 2017/0061031 | A1* | 3/2017 | Jammikunta ......... G06F 16/172 |
| 2017/0124719 | A1 | 5/2017 | Long et al. |
| 2017/0169290 | A1 | 6/2017 | Held et al. |
| 2017/0228589 | A1 | 8/2017 | Parapurath et al. |
| 2017/0323035 | A1* | 11/2017 | Hori ....................... G06F 30/20 |
| 2018/0032807 | A1* | 2/2018 | Prebble .............. G06K 9/00456 |
| 2018/0336439 | A1* | 11/2018 | Kliger .................. G06N 3/0472 |
| 2018/0373961 | A1* | 12/2018 | Wang ..................... H04L 41/16 |
| 2019/0026550 | A1 | 1/2019 | Yang et al. |
| 2019/0073528 | A1 | 3/2019 | Agarwalla et al. |

OTHER PUBLICATIONS

Non-final Office Action dated Nov. 29, 2019 for U.S. Appl. No. 16/131,946, filed Sep. 14, 2018.

Final Office Action dated Jun. 2, 2020 for U.S. Appl. No. 16/131,946, filed Sep. 14, 2018.

Ablameyko et al, "Recognition of engineering drawing entities: review of approaches", International Journal of Image and Graphics,vol. 7, No. 4, Oct. 1, 2007 (Oct. 1, 2007), p. 709-733.

Adam S et al, "Symbol and Character Recognition: Application to Engineering Drawings", International Journal on Document Analysis and Recognition, Springer, Heidelberg, DE,vol. 3, No. 2, Dec. 1, 2000 (Dec. 1, 2000), p. 89-101.

Anonymous, "Lab 1: Simulating Control Systems with Simulink and MATLAB", Sep. 7, 2005 (Sep. 7, 2005), 5 pages.

Fu et al, "From engineering diagrams to engineering models: Visual recognition and applications", Dec. 25, 2010 (Dec. 25, 2010), vol. 43, No. 3, p. 278-292.

Gao et al, "Segmentation and recognition of dimension texts in engineering drawings", Document Analysis and Recognition, 1995., Proceedings of the Third Int Ernational Conference on Montreal, Que., Canada Aug. 14-16, 1995, Los Alamitos, CA, USA,IEEE Comput. Soc, US,vol. 1, Aug. 14, 1995 (Aug. 14, 1995), p. 528-531.

Jin et al, "Practical technique in conversion of engineering drawings to CAD form", Instrumentation and Measurement Technology Conference, 1998. IMTC/98. Conference Proceedings. IEEE St. Paul, MN, USA May 18-21, 1998, New York, NY, USA,IEEE, US,vol. 1, May 18, 1998 (May 18, 1998), p. 8-13.

International Search Report and Written Opinion in PCT/US18/51176, dated Dec. 6, 2018.

Neuberg, "Creating a Modern OCR Pipeline Using Computer Vision and Deep Learning," In: blogs.dropbox.com, Apr. 12, 2017, retrieved online on Nov. 15, 2018, <URL: http://blogs.dropbox.com/tech/2017/04/creating-a-modern-ocr-pipeline-using-computer-vision-and-deep-learning/>, entire document, especially Abstract; pp. 1-7, 12-15.

Fu et al., "From engineering diagrams to engineering models: Visual recognition and applications," Computer-Aided Design 43 (2011) 278-292.

Extended European Search Report dated Jun. 21, 2021 for European Application No. 18855323.4.

Office Action dated Jan. 27, 2021 for U.S. Appl. No. 16/131,946, filed Sep. 14, 2018.

Final Office Action dated Aug. 3, 2021 for U.S. Appl. No. 16/131,946, filed Sep. 14, 2018.

\* cited by examiner

1365

```
id, string, locx, locy, char_height_max, spacing_horizontal, spacing
0, "Q345A/B", 0.58, 0.93, 30, 1.5, 0, H, 799, 760, 948, 790
1, "W-987", 0.56, 0.57, 28, 1.8, 0, H, 777, 466, 880, 494
2, "XXX-234-FFF-RRR", 0.03, 0.04, 19, 0.7, 0, H, 39, 32, 251, 51
3, "XXX-123-YYY-ZZZ", 0.02, 0.31, 19, 0.9, 0, H, 29, 255, 240, 274
4, "DE567", 0.3, 0.63, 17, 1.0, 27.0, H, 420, 514, 453, 558
5, "AAA123", 0.38, 0.17, 17, 1.0, 27.0, H, 532, 141, 575, 185
6, "BBB234", 0.58, 0.26, 17, 0.8, 27.0, H, 809, 211, 850, 255
7, "CC345", 0.67, 0.26, 17, 0.5, 27.0, H, 922, 211, 955, 255
8, "R35", 0.87, 0.18, 28, 2.0, 0, H, 1202, 146, 1261, 174
```

CLASSIFICATION OF PIPING AND INSTRUMENTAL DIAGRAM INFORMATION USING MACHINE-LEARNING

CROSS-REFERENCE TO RELATED APPLICATIONS

The present application is a continuation of and claims priority to U.S. patent application Ser. No. 16/131,946 filed on Sep. 14, 2018 and entitled "Classification of Character Strings Using Machine-Learning," which is related to and claims the benefit of U.S. Provisional Application No. 62/558,383 filed on Sep. 14, 2017, and U.S. Provisional Application No. 62/653,193 filed on Apr. 5, 2018, the contents of each of which are hereby incorporated herein by reference in their entirety.

FIELD

The present disclosure relates generally to pattern recognition and more particularly to identifying patterns of symbols in standardized system diagrams using machine learning techniques.

BACKGROUND

Piping and instrumentation diagrams ("P&ID") are engineering drawings that illustrate engineering process flows together with instruments used to implement those process flows. P&IDs may include tags or labels used to capture diverse types of design information, such as installation information, material, sequence information, hazard information, or other information, related to the P&ID diagram. In many cases, it is useful to extract, identify, and categorize the tags and labels associated with a P&ID so that the P&ID and its provided information may be accessible and searched within a database system.

Current methods of P&ID tagging rely on manual efforts to identify P&ID tags and generate a tag index list. For example, a human operator may visually inspect P&IDs to extract information components, including symbols, tags, and the organization thereof and catalog these components in a database. In some examples, Optical Character Recognition (OCR) technology may also be used to assist in this process. However, these solutions are ultimately inefficient and inaccurate. These solutions are neither cost effective nor robust.

SUMMARY

Machine learning models may be applied to P&ID diagrams to extract graphical components, such as symbols and process loops representing the transport of chemical components or physical components, or control processes, in order to overcome the shortcomings of existing OCR-based and manual categorization solutions. Some embodiments of the disclosure implements a multi-tiered framework to identify symbol representing the equipment, schematic lines (e.g., connector lines) representing the connections between the equipment, and tags encoding the contextual information and/or a variety of design specifications. The model may be a machine learning algorithm such as a convolutional neural network, decision tree, or other machine learning algorithm as known in the art. The training data may be synthetic or collected from actual previously tagged P&ID diagrams.

One aspect of the present disclosure relates to a system configured for identifying—symbols in standardized system diagrams. The system may include one or more logical circuits configured by machine-readable instructions. The processor(s) may be configured to obtain a symbol—recognition training data set including multiple training images. The processor(s) may be configured to generate a symbol recognition model based on the symbol recognition training data set. The processor(s) may be configured to obtain an image including a pattern of symbols. The symbols may include complicated geometry that are used to represent mechanical or electrical component. The processor(s) may be configured to apply the symbol recognition model to the geometry to recognize the symbol. The processor(s) may be configured to store the identified symbols in a relational database.

Another aspect of the present disclosure relates to a method for identifying patterns of symbols in standardized system diagrams. The method may include obtaining a symbol classification training data set including multiple training images. The method may include generating a symbol classification model based on the symbol classification training data set. The method may include obtaining an image including a pattern of symbols. The symbols may include one or more contours. The method may include clustering symbols into hierarchical groups based on the location information of the contours. The method may include applying the symbol classification model to the contours to identify the symbols and hierarchical groups. The method may include storing the identified symbols in a relational database together with corresponding hierarchical groups.

Embodiments of the present disclosure provide systems and methods for classifying patterns of shapes or objects, such as alphanumeric characters, in an image by utilizing machine learning based techniques. In some embodiments, the method may include generating character classification training data and building a character classification model based on the character classification training data. The method may include finding all the contours in an image, clustering the contours, applying the character classification model to the image to classify the contours as target characters or non-characters, and extracting clustered groups of characters as tags or labels of interest.

Embodiments disclosed herein may include a system for classifying patterns of shapes as characters and grouping characters into tags. For example, the system may include a data store and a character classification logical circuit. The character classification logical circuit may include a processor and a non-transitory computer readable medium with computer executable instructions embedded thereon, and the computer executable instructions may be configured to cause the processor to generate character classification training data, build a character classification model based on the character classification training data, and apply the character classification model to the image to classify target characters. In some embodiments, the system may identify tags by localizing the image contours relative to the whole image, labelling the contours as characters or non-characters based on the character classification model, and clustering characters into hierarchical groups based on the location information of the characters. The system may extract tags or labels from the groups of characters based on the patterns of characters within the groups.

In some embodiments of the disclosed technology, a tag extraction process may include identifying one or more text areas within the image, the text areas comprising groupings of characters. The text areas may be identified using a text area identification model. In some embodiments, the text area identification model may include a machine learning algorithm. The tag extraction process may include scanning the identified text areas with a trained character classification model to classify individual characters, and then extract and/or store the identified characters.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 3H illustrates the tags extracted from the example input image of FIG. 3B according to embodiments disclosed herein.

FIG. 9C illustrates examples bi-gram patterns, consistent with embodiments disclosed herein.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

Embodiments of the present disclosure provide systems and methods for categorizing symbol and character patterns utilizing machine learning based techniques. By doing so, data and information of interest may be sourced from the documents, associated with the documents, identified and categorized, for example, in a database. It should be noted that these documents may include P&IDs, diagrams, blueprints, or any other sources containing information that can be identified as symbols, characters or strings of characters. Identified symbols or tags may be indexed and stored in a database, such that the documents and corresponding information may be easily stored and searched within the database.

In some examples, symbols in an image may be grouped together, and identified using machine learning-based methodologies. By way of example, machine learning offers a powerful approach to localize certain areas and recognize the contained contextual information provided as images. Machine learning-based techniques may include deep learning processes, such as convolutional neural networks. A convolution neural network is a class of deep, feed-forward artificial neural network that analyzes a training data set to learn observable feature patterns within the data, and then may apply those learned patterns to future data sets, and can adaptively update these learning patterns based on the new data set if an updated model is determined to be necessary.

Some embodiments disclosed herein may incorporate the use of convolutional neural network algorithm for both image recognition and image classification in different subtasks of the whole workflow. For instance, in some examples, a convolutional neural network, or other machine learning model, may be used to analyze P&ID diagrams and recognize symbol images contained therein. The convolutional neural network, or other machine learning model, may also be implemented to identify text areas or characters contained in the P&ID diagram. The design of related neural architecture and training processes may be different based on the context of different tasks, as would be understood in the art.

Figure 1:
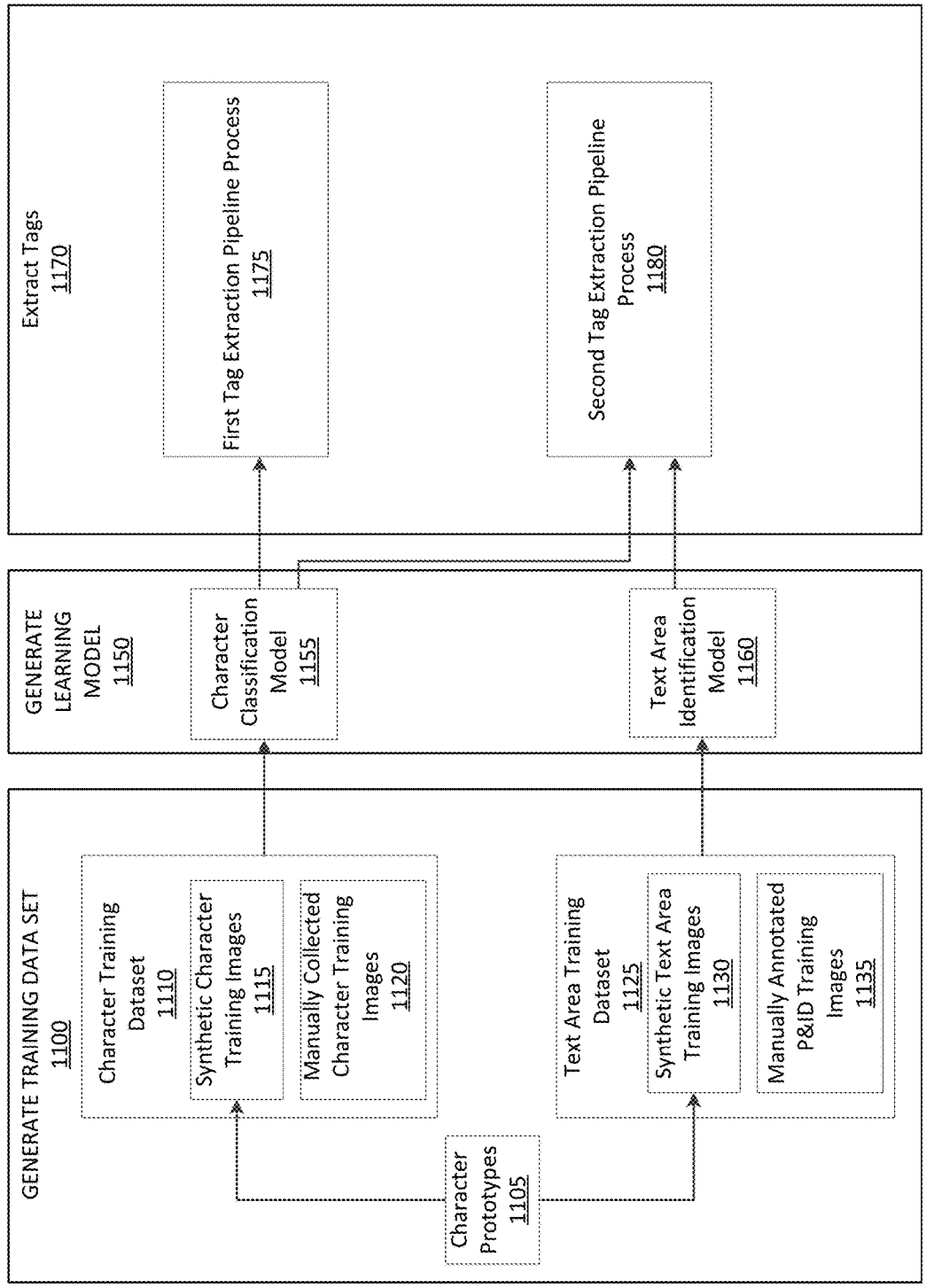
FIG. 1 illustrates an example computer implemented method of recognizing and categorizing character-based document tags using a machine learning model, consistent with embodiments disclosed herein.

FIG. 1 illustrates a machine learning based method for processing an image, recognizing character tags within the image, and extracting and associating character tags found therein with the original image. Associating such character tags with the original image enable a large set of images to be indexed and searched by the tags contained in each image. As illustrated, the method may include generating a training data set 1100, generating a learning model 1150 that learns to recognize characters of interest from the training data set 1100, and implementing a tag extraction process 1170 that identifies tags of interest from images for indexing purposes. In some examples, the training data set may be synthetic, in that it is generated through an automated process as disclosed herein. Tag extraction process 1170 may include a first tag extraction pipeline process 1175 and/or a second tag extraction pipeline process 1180.

The process of extracting tags from a P&ID image may include generating a training data set 1100. The character training datasheet 1110 may include an extensive list of character prototypes 1105 for use in the character classification model 1155. The text area training datasheet 1125 may include an extensive list of character prototypes 1105 for the text area identification model 1160.

Acquiring sufficient labeled data for either of the two above mentioned models through manual means may be time consuming, inconsistent, and costly to assemble. For example, using existing P&ID diagrams as a training set requires manual processing to label tags and objects within the diagram, which requires manual labor and time, is constrained by the availability of existing P&ID data, and may be prone to human error and mis-categorization. In contrast, embodiments disclosed herein provide methods for generating synthetic P&ID training data. The synthetic training data set allows for more flexibility in creation of a wide and complete variety of P&ID data, and may be pre-labeled by the system that creates the synthetic data.

Still referring to FIG. 1, the method may include generating a learning model 1150. For example, the learning model may be configured using a machine learning algorithm to learn from training data set 1100 to recognize characters of interest. In some examples, the learning model may include a character classification model 1155. Character classification model 1155 may be a machine learning model, e.g., a convolutional neural network, a support vector machine, a gradient boosted decision tree, a logistic regression, or other machine learning models. Character classification model 1155 may be trained using character training dataset 1110. In some examples, character classification model 1155 may be trained to recognize characters in an image, e.g., a P&ID. In some examples, the character classification model 1155 may be trained to classify one or more image patches as 1-of-n objects and/or characters of interest.

In some embodiments, the learning model includes a text area identification model 1160. Text area identification model 1160 may include a machine learning model, e.g., a convolutional neural network-based image segmentation or similar type of model trained to recognize text areas in a given image. For example, the text area identification model may be trained using synthetic text area training images 1130 and/or manually annotated P&ID training images 1135. Text area identification model 1160 may be trained to localize and identify multiple objects in one or more images.

Still referring to FIG. 1, the method may include a tag extraction process 1170, which may include one or more tag extraction pipeline processes. For example, one tag extraction pipeline process 1175 may include processing an image to identify and locate whitespace separated contours. The tag extraction pipeline process 1175 may also include classifying the contours with a character classification model, e.g., trained character classification model 1155. In some examples, first tag extraction pipeline process 1175 may include grouping contours and/or characters into tags.

In some examples, tag extraction process 1170 may include a complementary or alternative tag extraction pipeline process 1180. The tag extraction pipeline process 1180 may include applying a text area identification model, e.g., trained text area identification model 1160 to localize text groups within in an image, and in some examples, within a text area within the image. In some examples, tag extraction pipeline process 1180 may include scanning the localized text areas to identify individual characters contained therein. Tag extraction pipeline processes 1175 and 1180 may operate individually or be combined in order to increase accuracy in tag extraction.

Figure 2A:
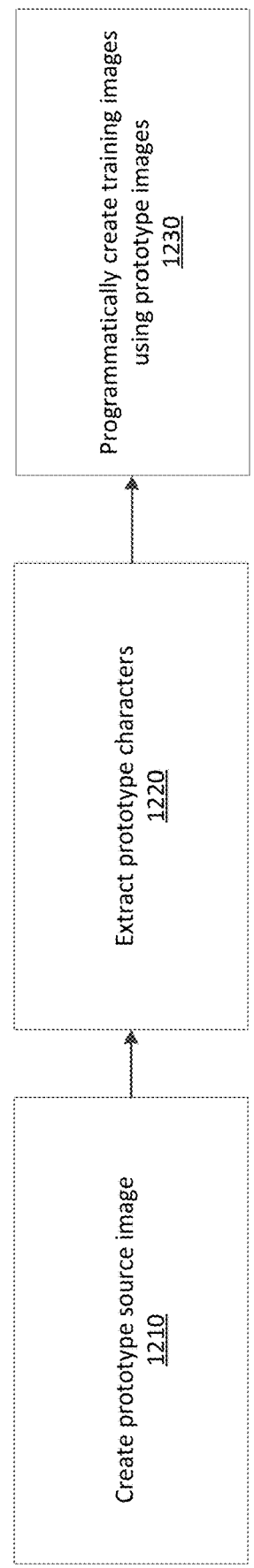
FIG. 2A illustrates an example process for synthetic training data generation for a character classification model, consistent with embodiments disclosed herein.

FIGS. 2A-2D illustrate an example of synthetic training data generation process, e.g., for training character classification model 1155. FIG. 2A illustrates a flowchart of a process used to generate synthetic training data.

Referring to FIG. 2A, a method for generating synthetic training data may include creating a prototype source image at 1210 that includes characters and fonts selected to be recognized by the character classification model 1155. Method for generating synthetic training data may include extracting prototype characters from one or more sources image at 1220. For example, extracting prototype characters from a source image 1220 may also include labeling and storing the prototype characters. In some examples, the method for generating synthetic training data may include using the prototype characters to programmatically create an unlimited amount of training data by varying the size and position, combining them into n-grams, blurring, and/or adding noise for training the character classification model 1155.

Figure 2B:
FIG. 2B illustrates example characters and fonts of interest as used by embodiments disclosed herein.

FIG. 2B illustrates an example of an image 1215 that includes characters of interest because a valid P&ID tag may contain any of these characters. They are rendered in fonts similar to those commonly found in a P&ID image. In contrast, FIG. 2B also includes an example of an image 1216 that includes characters which are not allowed in an valid tag thus are examples of characters that should be classified as "discard". The fonts and characters of the first image 1215 may be classified as characters of interest by the character classification model, whereas the characters of the second image 1216 may be classified as "discard". Images similar to examples 1215 and 1216 can be used to construct a set of prototype character images which can then be used to generate training images for training the character classification model.

Figure 2C:
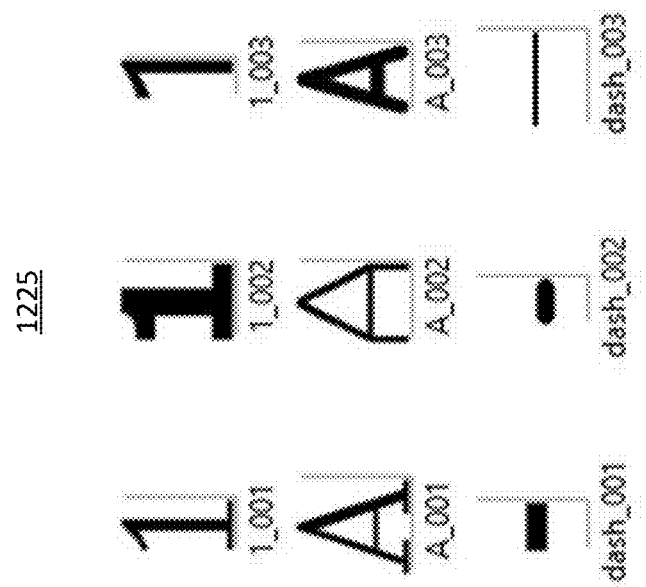
FIG. 2C illustrates example prototype characters as used by embodiments disclosed herein.
Figure 2D:
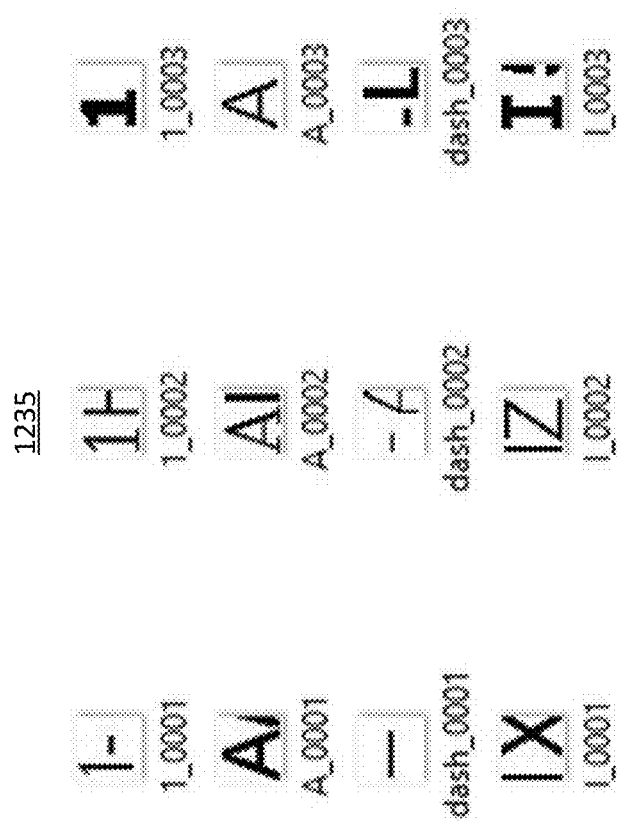
FIG. 2D illustrates example training images created from prototypes, consistent with embodiments disclosed herein.

FIG. 2C provides examples of prototype images 1105 that may be extracted from a prototype source image. FIG. 2D provides examples of training images 1115 which can be programmatically generated from prototype images. Programmatically generating synthetic character classification training data using methods disclosed herein enables creating a training dataset of unlimited size and variance for training character classification model 1155 to classify contours in an image as characters of interest. In order to further improve model accuracy, the character classification training data may include variances in size, position, blurring, and rotation of prototype characters, combinations prototype characters, and variance in noise levels.

In some embodiments, iteratively improving the character recognition model may include augmenting training data with any misclassified contour sub-images, retraining the character recognition model, and validating the character recognition model's accuracy, e.g., using manual verification or programmatically using a validation data set.

Figure 3A:
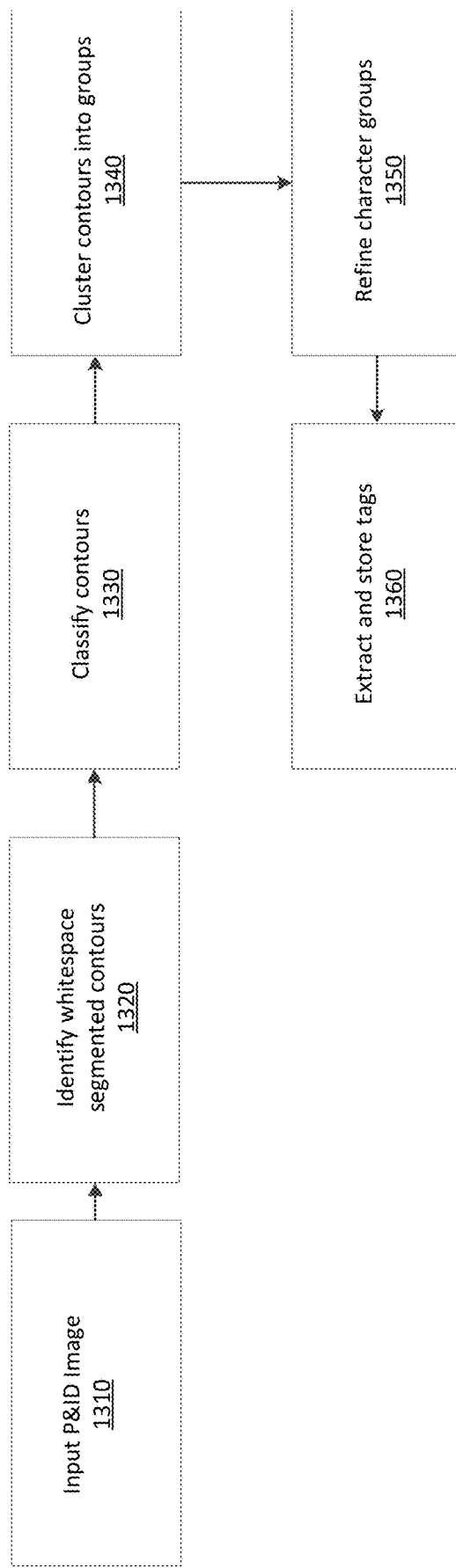
FIG. 3A illustrates an example process for tag extraction, consistent with embodiments disclosed herein.

FIGS. 3A-3H illustrate an example of the steps which may be implemented in the first tag extraction pipeline process 1175 depicted in FIG. 1. Referring to FIG. 3A, first tag extraction pipeline process may include inputting a P&ID image at step 1310. In some examples, the P&ID image may be input as an electronic file or using a digital camera, a scanner, a data store, or other electronic input means.

Method 1175 may include identifying whitespace segmented contours at step 1320. In some examples, method 1175 may include classifying the contours within the image by applying a trained classification model at step 1330. In some examples, method 1175 may include clustering contours into groups at step 1340. For example, identified characters may be hierarchically clustered based on their location within the image and proximity to each other. Text groups may be created from the resulting clusters of characters.

In some embodiments, method 1175 may include refining character groups at step 1150, e.g., by using various heuristics used to refine the text groups. Method 1175 may include extracting and/or storing tags at step 1360.

Figure 3B:
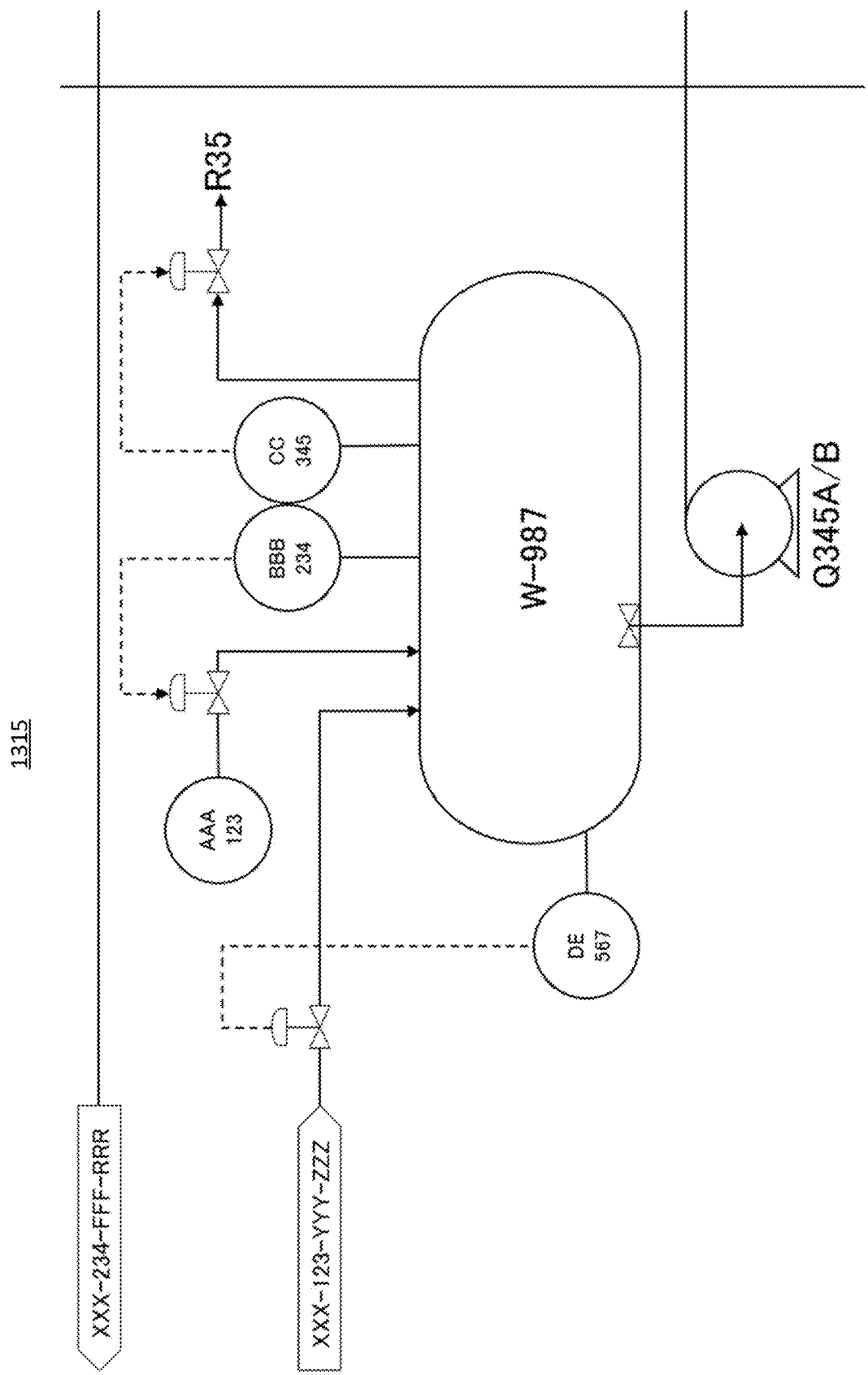
FIG. 3B illustrates an example of a partial P&ID input image, as used in embodiments disclosed herein.

FIG. 3B illustrates an example input P&ID sub-image 1315 that may be processed using first tag extraction pipeline process 1175.

Figure 3C:
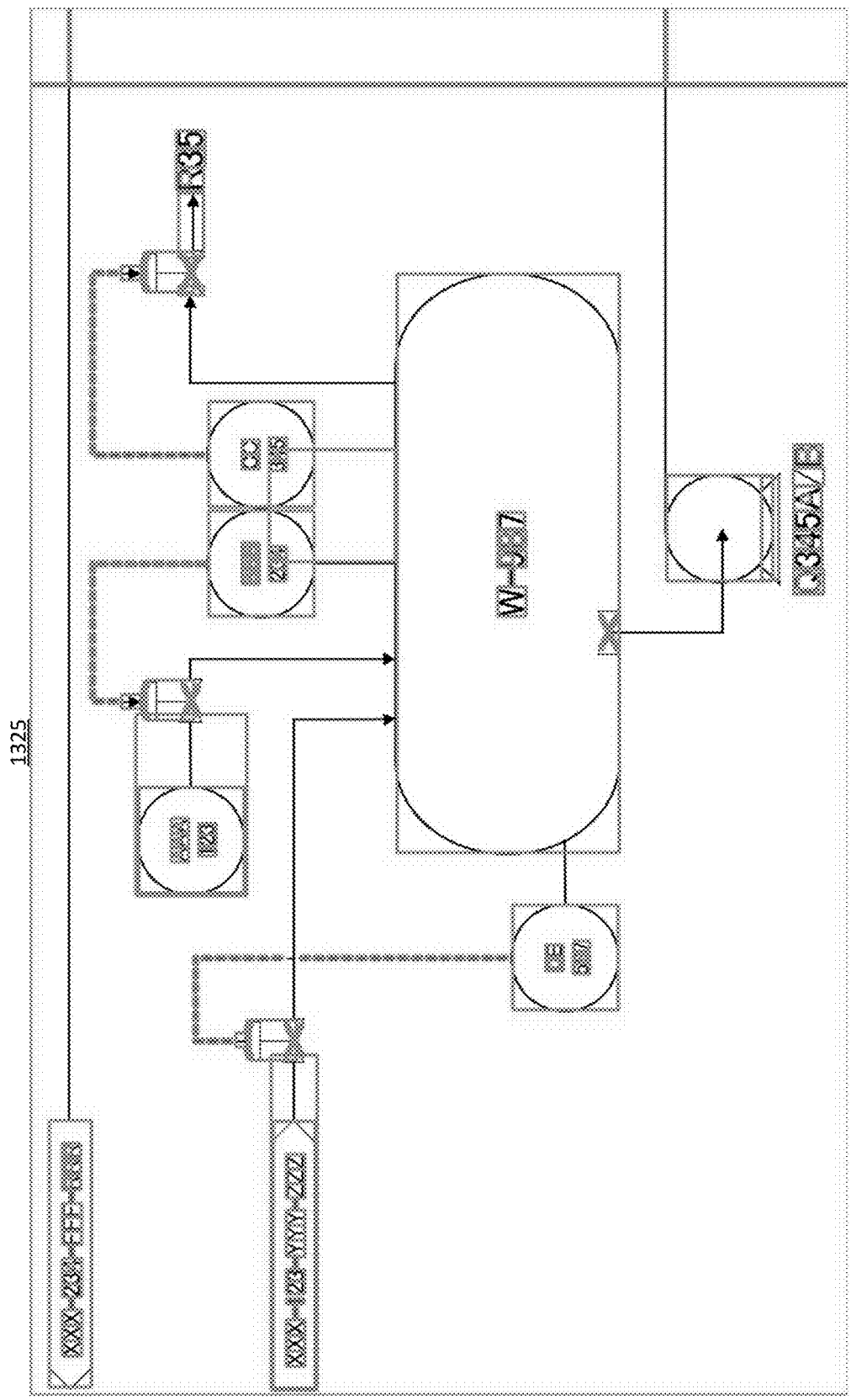
FIG. 3C illustrates the example input image of FIG. 3B, as processed to identify whitespace segmented contours according to embodiments disclosed herein.

FIG. 3C illustrates an example input P&ID sub-image 1325 that has undergone a process to identify whitespace segmented contours 1320.

Figure 3D:
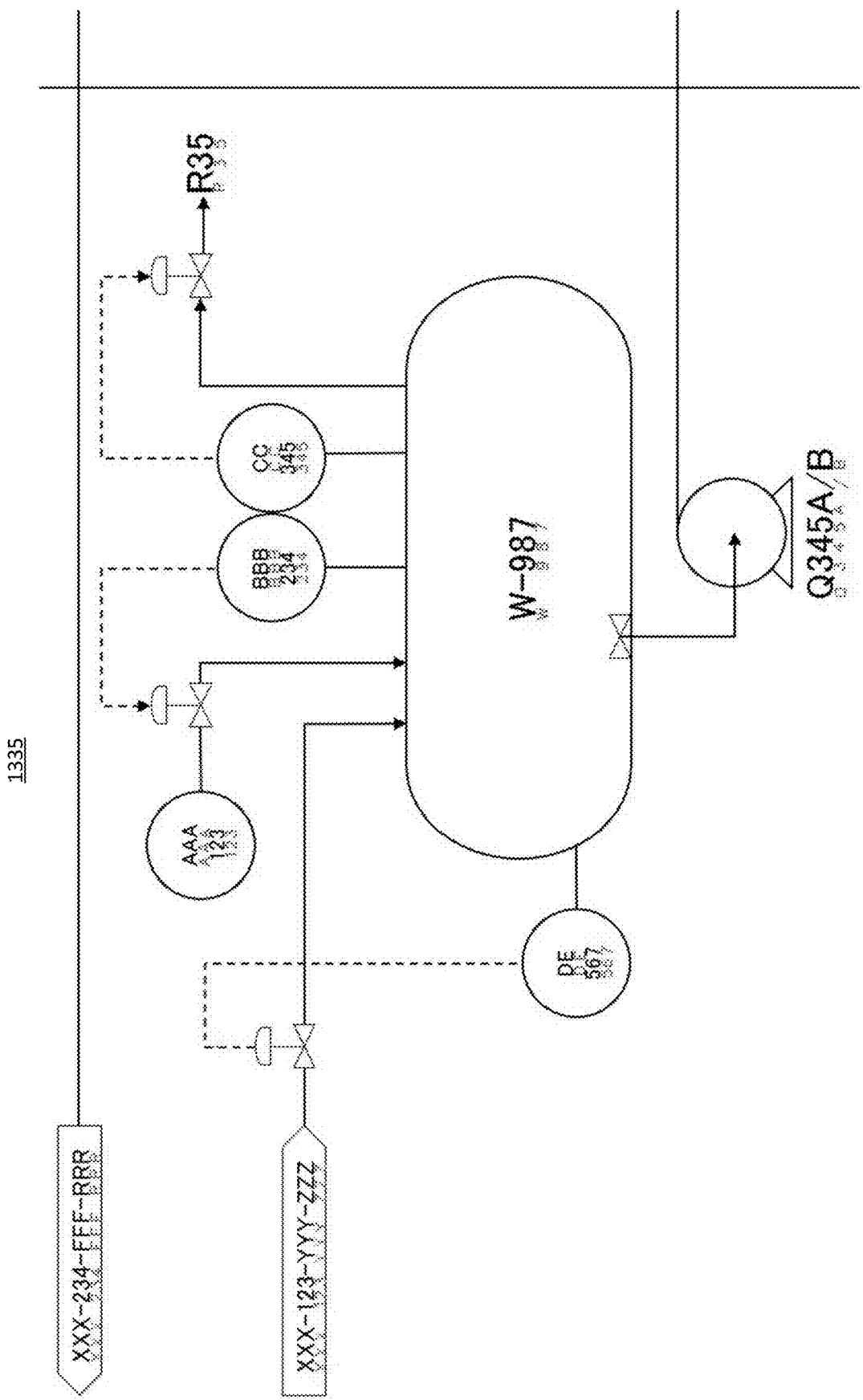
FIG. 3D illustrates the example input image of FIG. 3B, as processed to classify contours according to embodiments disclosed herein.

FIG. 3D illustrates an example input P&ID sub-image 1335 that has undergone a process to classify contours 1330.

Figure 3E:
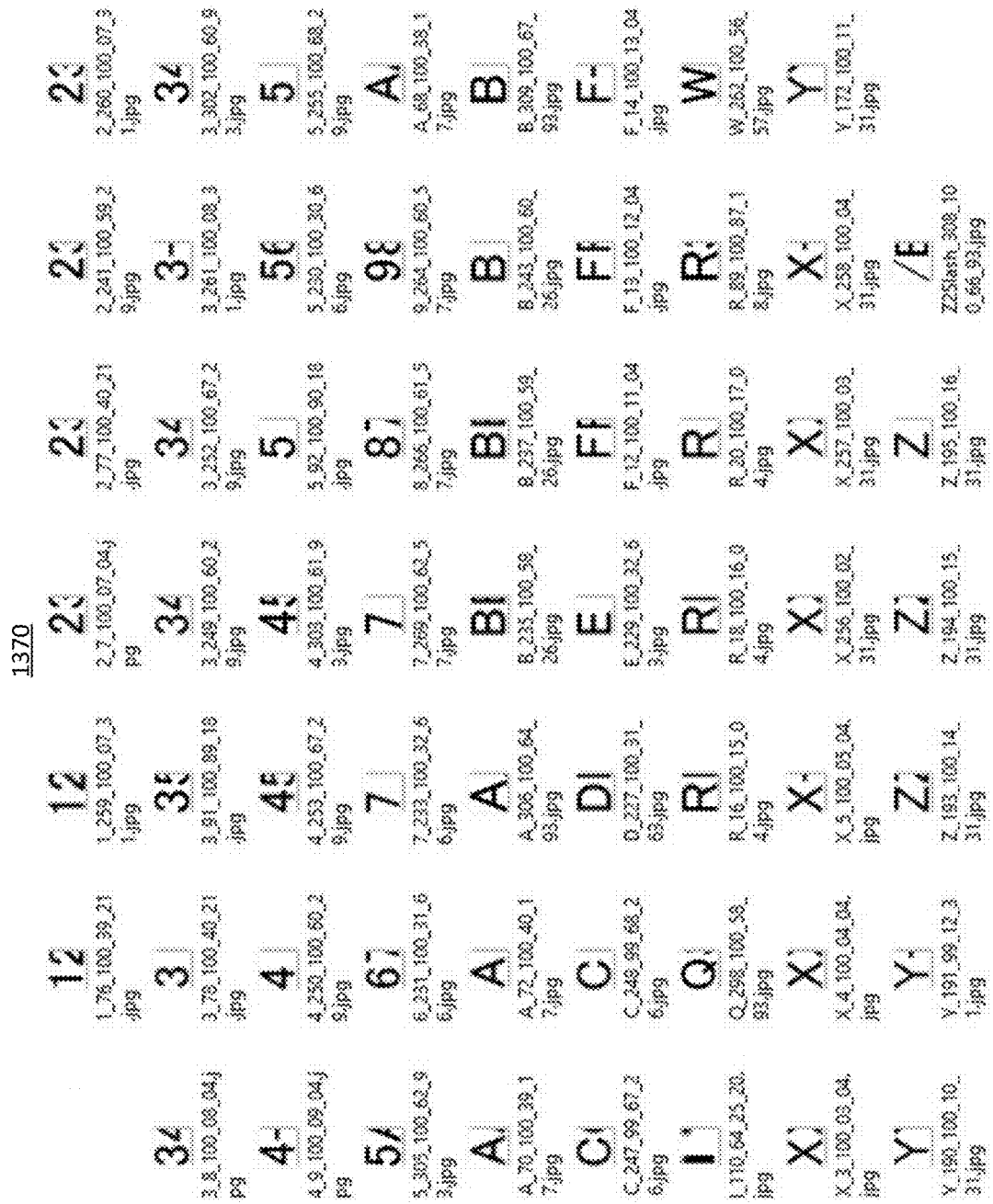
FIG. 3E illustrates examples of sub-image patches extracted and classified as characters of interest at each whitespace-segmented contour, as used by embodiments disclosed herein.

FIG. 3E illustrates examples of sub-images extracted from the example input P&ID image for whitespace segmented contours which have been classified as a character of interest by the character classification model 1155.

Figure 3F:
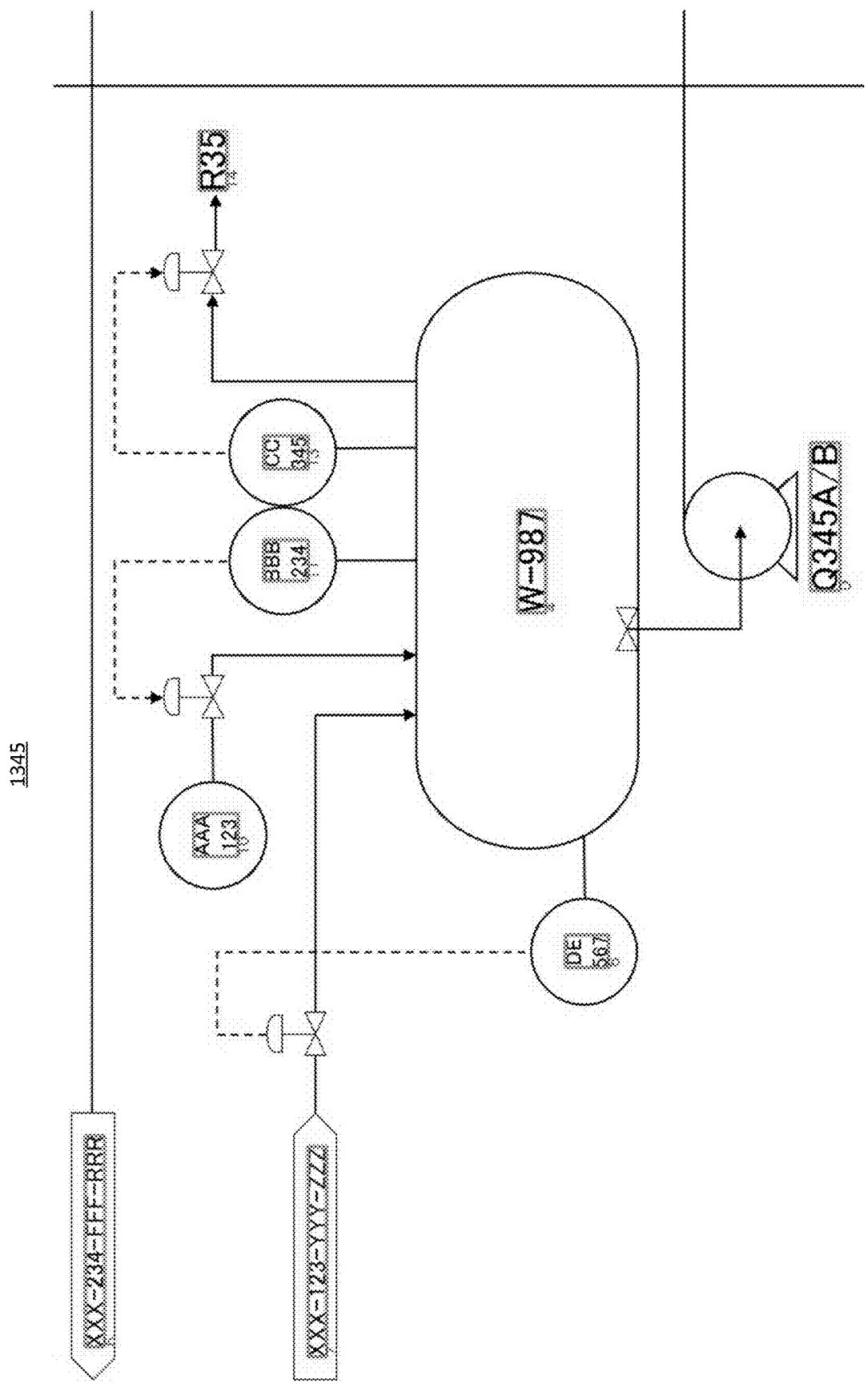
FIG. 3F illustrates the example input image of FIG. 3B, as processed according to embodiments disclosed herein.

FIG. 3F illustrates an example input P&ID image 1345 that has undergone hierarchical clustering 1340 of the identified characters based on their location within the image.

Figure 3G:
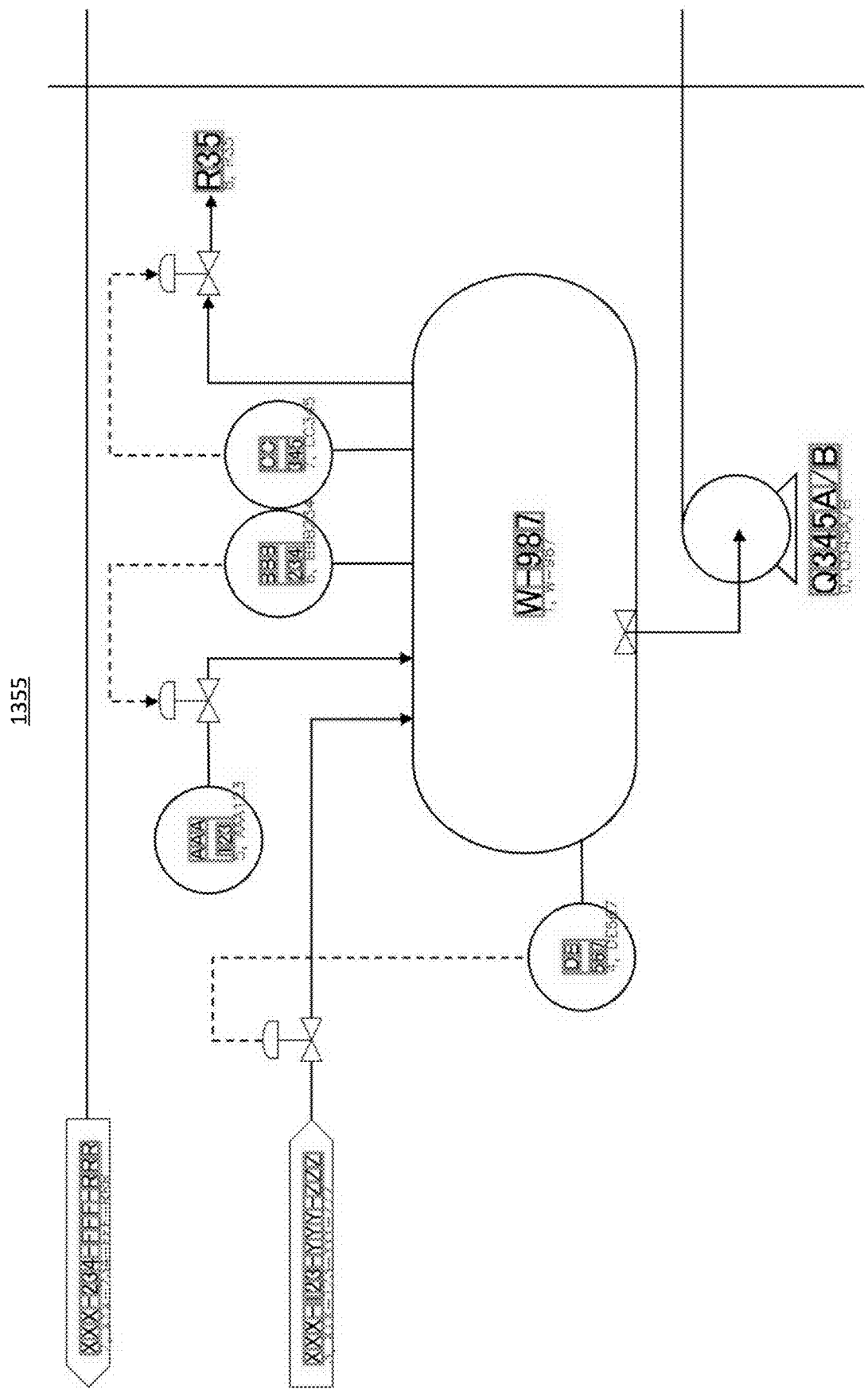
FIG. 3G illustrates the example input image of FIG. 3B, as processed to group classified characters according to embodiments disclosed herein.

FIG. 3G illustrates an example input P&ID image that has undergone refining of character groups 1350 using various heuristics used to refine the text groups created in the previous step. In some examples, the method may include additional heuristics for identifying non-segmented contours and determining whether a string is a tag using text classification.

FIG. 3H illustrates an example list of tags 1365 created in step six 1360 that may be extracted and/or stored.

Figure 4A:
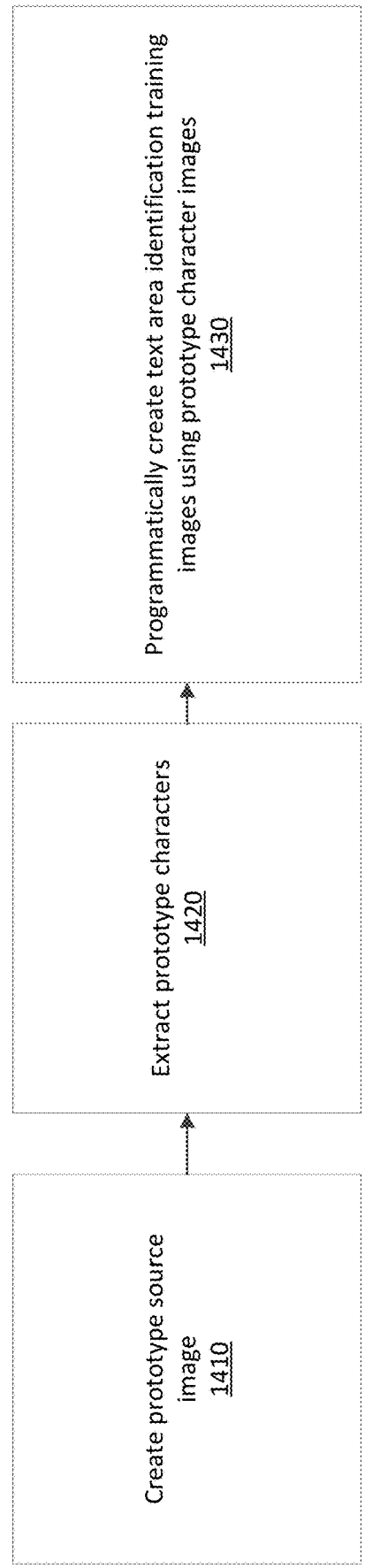
FIG. 4A illustrates an example method for generating training data for text area identification, consistent with embodiments disclosed herein.
Figure 4B:
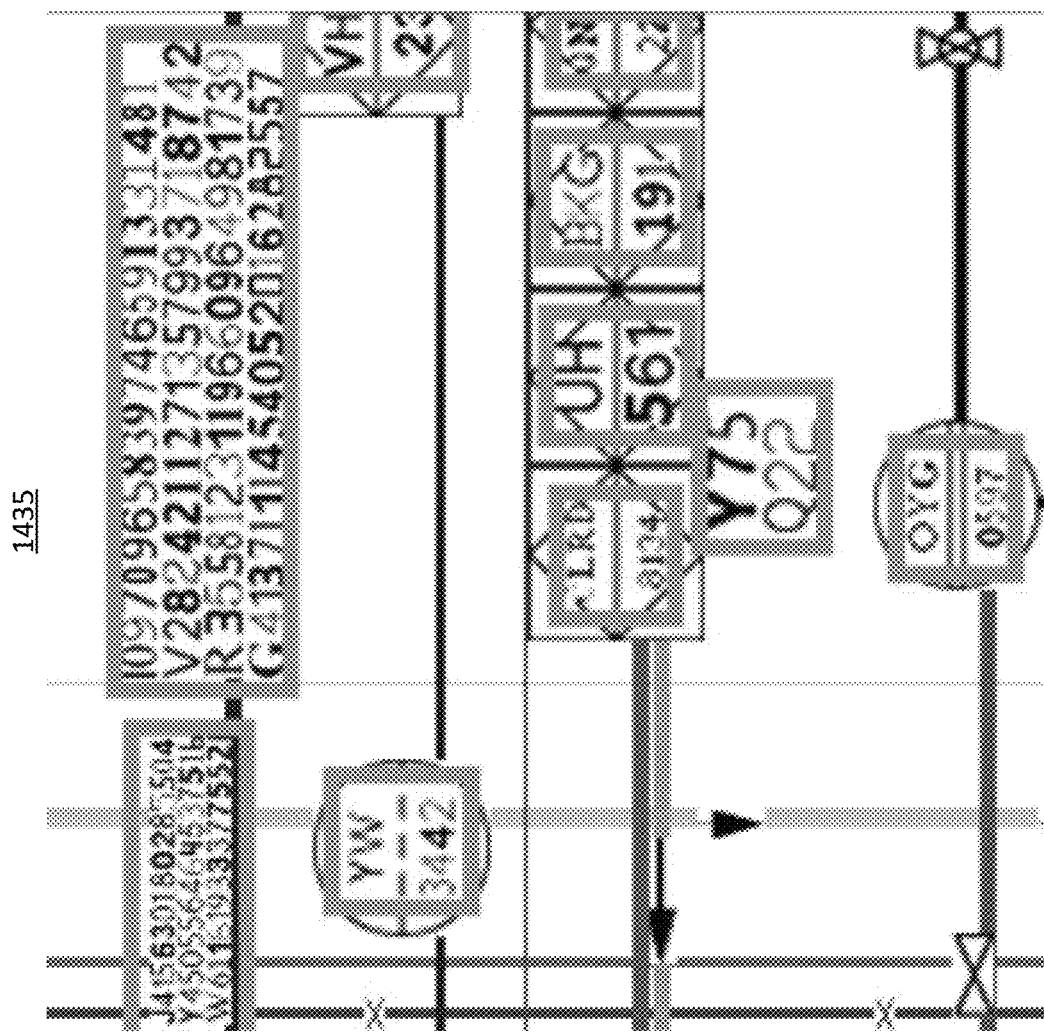
FIG. 4B illustrates an example of programmatically created training images according to embodiments disclosed herein.

FIGS. 4A and 4B illustrate an example method for generating synthetic training data for text identification model 1160. FIG. 4A illustrates a flowchart of an example process used to generate synthetic training data. The method may include creating a prototype source image at step 1410 and extracting prototype characters at step 1420. In some examples, prototype characters may be identified and extracted. The method may include programmatically creating multiple training images (e.g., an unlimited number of training images) by positioning random and patterned text areas built from random groups of character prototypes on a background image which may also contain randomly generated lines, symbols, other objects/noise common on a P&ID. FIG. 4B illustrates an example of a training image 1435 with text areas which may be identified by applying text area identification model 1160.

Figure 5:
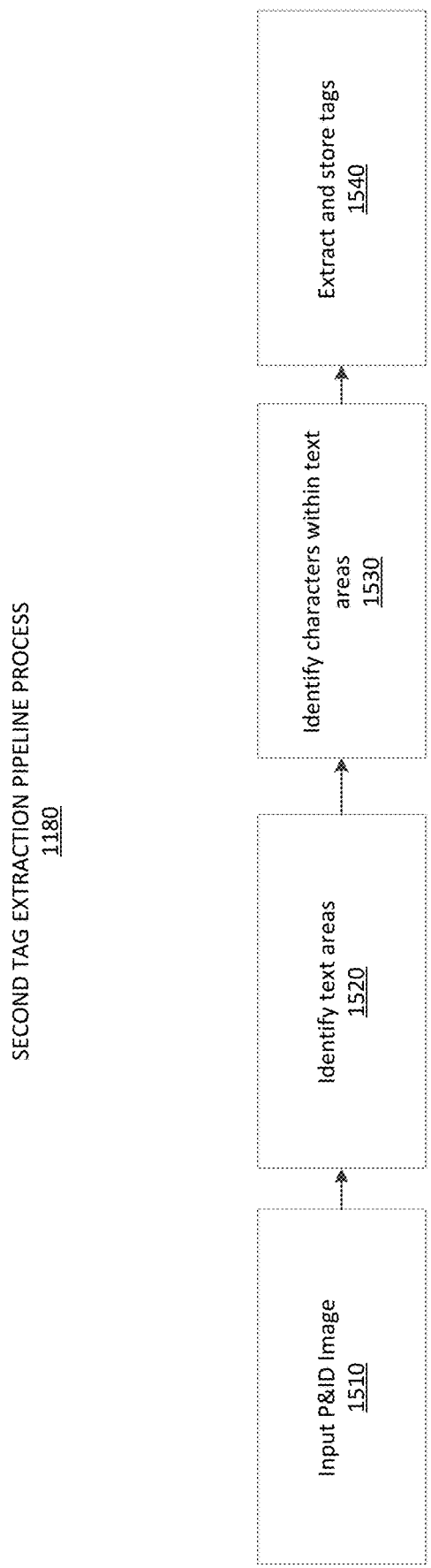
FIG. 5 illustrates an example method for tag extraction using a text area identification model, consistent with embodiments disclosed herein.

FIG. 5 illustrates second tag extraction pipeline process 1180. As illustrated in FIG. 5, method 1180 may include receiving as input an image, e.g., a P&ID. Method 1180 may include identifying text areas in the image, e.g., by applying trained text area identification model 1160. In some examples, method 1180 may include identifying characters within the text areas at step 1530 and extracting and/or storing tags at step 1540. Embodiments of second tag extraction pipeline process 1180 may be applied the example input images and characters illustrated in FIGS. 3B-3H.

Figure 6:
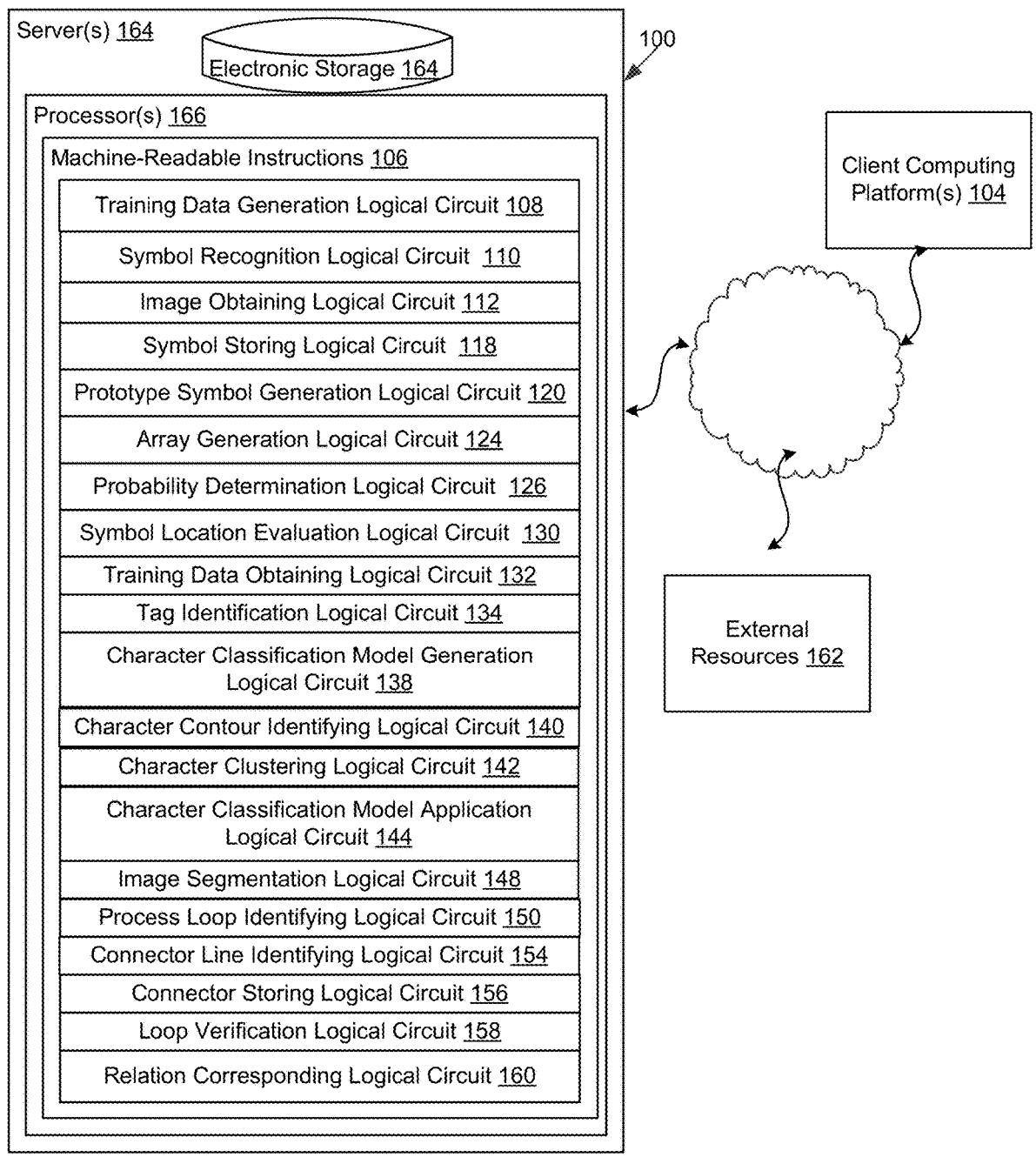
FIG. 6 illustrates a system configured for recognizing tags, symbols and process loops in standardized system diagrams, in accordance with one or more implementations.

FIG. 6 illustrates a system 100 configured for identifying design contexts, including symbols, tags and process loops in standardized system diagrams, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may include one or more processors 166 and one or more non-transitory memories with machine readable instructions 106 embedded thereon. In some embodiments, a processor 166 and non-transitory memory with machine readable instructions 106 embedded thereon may form a logical circuit. In some examples, server(s) 102 may include one or more logical circuits. The logical circuits may include computer program modules. In some examples, server(s) 102 may include one or more of a synthetic training data generation logical circuit 108, a symbol recognition logical circuit 110, an image obtaining logical circuit 112, a, a symbol storing logical circuit 118, a prototype symbol generation logical circuit 120, an array generation logical circuit 124, a probability determination logical circuit 126, a symbol location evaluation logical circuit 130, a training data obtaining logical circuit 132, a tag identification logical circuit 134, a character classification model generation logical circuit 138, a character contour identifying logical circuit 140, a character clustering logical circuit 142, a character classification model application logical circuit 144, an image segmentation logical circuit 148, a process loop identifying logical circuit 150, a connector line identifying logical circuit 154, a connector storing logical circuit 156, a loop verification logical circuit 158, a relation corresponding logical circuit 160, and/or other logical circuits and/or instruction modules.

Training data generation logical circuit 108 may be configured to obtain a symbol recognition training data set including multiple training images. Training data may include multiple images (e.g., image patches cropped from standardized system diagrams, such as P&ID diagrams). In some embodiments, the training data may be synthetically generated to include a set of studied symbols along with different scales. In some embodiments, the training data may be collected from existing or previously cataloged images or digitalized images. The training data may be manually reviewed to identify symbols, tags, and/or process loops and entered into a training database for use by a machine learning model to compare with the model's identifications relating to the same symbol in the training images.

Symbol recognition logical circuit 110 may be configured to generate a symbol recognition model based on the symbol recognition training data set. The symbol classification model may include a machine learning algorithm, e.g., a convolutional neural network, faster R-CNN, decision tree, or other machine learning algorithm as known in the art.

Image obtaining module 112 may be configured to obtain an image including a pattern of symbols. For example, the symbols may correspond to equipment represented in the P&ID diagrams. The symbols may be standard or customized engineering symbols. For example, the symbols may represent tanks, valves, pipes, sensors, instruments, or other types of equipment and/or system components as known in the art.

The symbols are generally shown as geometric shapes representing functional components in the P&IDs or other engineering documents. Each symbol may include one or more contours.

Symbol location evaluation logical circuit 130 may be configured to apply the symbol recognition model to the image patches including more than one geometric shapes to identify the related symbols.

Symbol storing logical circuit 118 may be configured to store the identified symbols in a relational database together with corresponding process loops consisting multiple symbols. The identified symbols may have been identified by the machine learning algorithm or via manual identification through a graphical user interface. The symbol may include an arbitrary sign (written, printed, or otherwise displayed) that has acquired a conventional significance, according to some implementations, e.g., as an industry standard or legend associated with engineering process diagrams. The relational database may be an electronic database. The relational database may include a database in which relations between information items are explicitly specified as accessible attributes, according to some implementations.

Prototype symbol generation logical circuit 120 may be configured to create prototype symbols of interest. Prototype symbols of interest may include shapes or designs that emulate standard or customized engineering symbols as used in P&ID diagrams. By way of non-limiting example, obtaining the symbol classification training data may further include modifying a size, translation, rotation, or other possible variances of the prototype symbols of interest. The possible variance may include a variance that is capable of happening or existing, according to some implementations. The variance may be a deviation. The variance may include an event that departs from expectations, according to some implementations.

Prototype symbol storing module 122 may be configured to store the prototype symbols of interest in a data store as templates for programmatically creating varied training images. The data store may be a database or physical storage device, such as magnetic or solid state storage. The data store may be a local, network, and/or cloud-based data storage device. A given template may be a model. The template may include a model or standard for making comparisons, according to some implementations.

Array generation logical circuit 124 may be configured to generate a first array of symbol location regions within the image. The array may be an arrangement. The array may include an orderly arrangement, according to some implementations. Examples of the array may include one or more of bank, column, matrix, panoply, row, spectrum, table, and/or other arrays.

Array generation logical circuit 124 may be configured to generate a second array including symbol location regions for which the probability that a symbol location region of the first array includes a symbol of interest exceeds a selected threshold value. The selected threshold value may include a probability or probabilities selected by a user through a graphical user interface. In some examples, the threshold value may be tuned or adjusted by a user to affect the accuracy of the machine learning algorithm. For example, the threshold value may be adjusted by a user during a verification step to confirm that symbols identified by the model within the P&ID diagrams are accurate. The verification may be performed using a graphical user interface. The probability may be a measure. The probability may include a measure of how likely it is that some event will occur; a number expressing the ratio of favorable cases to the whole number of cases possible, according to some implementations. Examples of the probability may include one or more of conditional probability, cross section, exceedance, fair chance, fat chance, joint probability, risk, risk, and/or other probabilities.

Probability determination logical circuit 126 may be configured to determine, with the symbol recognition model, a probability that a symbol location region of the first array includes a symbol of interest.

Probability determination logical circuit 126 may be configured to determine a probability that a symbol location region of the first array includes a symbol of interest by evaluating if related symbols of interest are present in any adjacent symbol location region. For example, adjacent symbols may include symbols located next to or nearby a symbol of interest being evaluated. Related symbols may be connected either logically or causally or by shared characteristics, according to some implementations. Probability determination logical circuit 126, together with symbol location evaluation logical circuit 130, may be configured to recognize patterns in the images (e.g., symbols of interest, patterns of contours, etc.).

In some examples, symbol location evaluation logical circuit 130 may be configured to evaluate the symbol location regions in a sequential order. The sequential order may include an order that is in regular succession without gaps, according to some implementations.

Training data obtaining logical circuit 132 may be configured to obtain the training data by applying a fixed or a stochastic noise pattern to one or more images.

Tag identification logical circuit 134 may be configured to identify standardized system diagram tags based on the characters clustering result and storing the identified standardized system diagram tags in the relational database together with the corresponding locations. Standardized system diagram tags may include P&ID tags.

Character classification model generation logical circuit 136 may be configured to obtain a character classification training data and generate a character classification model based on the character classification training data. Character contour identifying logical circuit 140 may be configured to identify character contours within the images. Character clustering logical circuit 142 may be configured to cluster the characters into character hierarchical groups based on the location information of the character contours. Character classification model application logical circuit 144 may be configured to apply the character classification model to the character contours to identify the characters.

The relational database may be searchable from a graphical user interface. The graphical user interface may be an interface. The graphical user interface may include a user interface based on graphics instead of text; uses a mouse as well as a keyboard as an input device, according to some implementations.

Image segmentation logical circuit 148 may be configured to segment the image and applying heuristics to the image to suppress non-character contours and identify character contours. A given heuristic may be a rule. The heuristic may include a commonsense rule intended to increase the probability of solving some problem, according to some implementations. Examples of the heuristic may include one or more of lateral thinking and/or other heuristics.

Process loop identifying logical circuit 150 may be configured to identify process loops in the images corresponding to related groups of symbols. The configured algorithms can be transferable to identify polygons, amorphous shapes, open shapes, or other graphical structures as known in the art. In some examples, symbol recognition logical circuit 110 may be configured to identify a first symbol of interest within the image corresponding to a component of interest known to belong to a process loop. Symbol recognition logical circuit 110 may also be configured to identify a second symbol of interest coupled to the first connector line.

Connector line identifying logical circuit 154 may be configured to identify a first connector line extending from the first symbol of interest. Connector line identifying logical circuit 154 may be used by or in coordination with process loop identifying logical circuit 150 to identify process loops and/or other geometric shapes in the image, Connector line identifying module 154 may be configured to identify a second connector line extending from the second symbol of interest.

Connector line identifying circuit 154 may be configured to identify additional connector lines extending from corresponding symbols of interest until a terminating connector line is identified to couple back into the first symbol of interest, such that the identified connector lines and corresponding symbols of interest form a closed loop.

Connector line identifying logical circuit 154 may be configured to identify connector lines using an edge detection process, using a topological structure analysis algorithm over the graph, or using other pattern recognition algorithms as known in the art.

Connector storing logical circuit 156 may be configured to store the identified connectors and corresponding symbols of interest together in the relational database as an identified process loop. By way of non-limiting example, the identified process loop may encode a chemical process, a physical process, or a control process.

The physical process may include processes implemented by a system described in P&ID diagrams. For example, physical processes may include hydro-carbon extraction, storage, refining, or other similar processes as known in the art. A physical process may include a sustained phenomenon or one marked by gradual changes through a series of states, according to some implementations. Loop verification logical circuit 158 may be configured to verify, with a graphical user interface, the identified loops. Relation corresponding logical circuit 160 may be configured to correspond tags are stored together in relation to corresponding standardized system diagrams within the relational database.

In some implementations, the images may include standardized system diagrams. In some implementations, the symbol classification training data may include a set standardized system diagrams including corresponding sets of symbols and hierarchical groups and manually identifying the symbols and hierarchical groups using a graphical user interface.

In some implementations, server(s) 102, client computing platform(s) 104, and/or external resources 162 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 162 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 162, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 162 may include sources of information outside of system 100, external entities participating with system 100, and/or other resources. In some implementations, some or all of the functionality attributed herein to external resources 162 may be provided by resources included in system 100.

Server(s) 102 may include electronic storage 164, one or more processors 166, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 164 may comprise non-transitory storage media that electronically stores information. The electronic storage media of electronic storage 164 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 164 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 164 may include one or more virtual storage resources (e.g., cloud storage, a virtual private network, and/or other virtual storage resources). Electronic storage 164 may store software algorithms, information determined by processor(s) 166, information received from server(s) 102, information received from client computing platform(s) 104, and/or other information that enables server(s) 102 to function as described herein.

Processor(s) 166 may be configured to provide information processing capabilities in server(s) 102. As such, processor(s) 166 may include one or more of a digital processor, an analog processor, a digital circuit designed to process information, an analog circuit designed to process information, a state machine, and/or other mechanisms for electronically processing information. Although processor(s) 166 is shown in FIG. 1 as a single entity, this is for illustrative purposes only. In some implementations, processor(s) 166 may include a plurality of processing units. These processing units may be physically located within the same device, or processor(s) 166 may represent processing functionality of a plurality of devices operating in coordination. Processor(s) 166 may be configured to execute machine-readable instructions as indicated by logical circuits 108, 110, 112, 118, 120, 124, 126, 130, 132, 134, 138, 140, 142, 144, 148, 150, 154, 156, 158, 160, and/or other modules. Processor(s) 166 may be configured to execute modules corresponding to logical circuits 108, 110, 112, 118, 120, 124, 126, 130, 132, 134, 138, 140, 142, 144, 148, 150, 154, 156, 158, 160, and/or other modules by software; hardware; firmware; some combination of software, hardware, and/or firmware; and/or other mechanisms for configuring processing capabilities on processor(s) 166. As used herein, the term "module" may refer to any component, logical circuit or set of components or logical circuits that perform the functionality attributed to the module. This may include one or more physical processors during execution of processor readable instructions, the processor readable instructions, circuitry, hardware, storage media, or any other components.

It should be appreciated that although logical circuits 108, 110, 112, 118, 120, 124, 126, 130, 132, 134, 138, 140, 142, 144, 148, 150, 154, 156, 158, and 160 are illustrated in FIG. 1 as being implemented within a single processing unit, in implementations in which processor(s) 166 includes multiple processing units, one or more of logical circuits 108, 110, 112, 118, 120, 124, 126, 130, 132, 134, 138, 140, 142, 144, 148, 150, 154, 156, 158, and/or 160 may be implemented remotely from the other modules. The description of the functionality provided by the different logical circuits 108, 110, 112, 118, 120, 124, 126, 130, 132, 134, 138, 140, 142, 144, 148, 150, 154, 156, 158, and/or 160 described below is for illustrative purposes, and is not intended to be limiting, as any of logical circuits 108, 110, 112, 118, 120, 124, 126, 130, 132, 134, 138, 140, 142, 144, 148, 150, 154, 156, 158, and/or 160 may provide more or less functionality than is described. For example, one or more of logical circuits 108, 110, 112, 118, 120, 124, 126, 130, 132, 134, 138, 140, 142, 144, 148, 150, 154, 156, 158, and/or 160 may be eliminated, and some or all of its functionality may be provided by other ones of logical circuits 108, 110, 112, 118, 120, 124, 126, 130, 132, 134, 138, 140, 142, 144, 148, 150, 154, 156, 158, and/or 160. As another example, processor(s) 166 may be configured to execute one or more additional modules that may perform some or all of the functionality attributed below to one of logical circuits 108, 110, 112, 118, 120, 124, 126, 130, 132, 134, 138, 140, 142, 144, 148, 150, 154, 156, 158, and/or 160.

Figure 7:
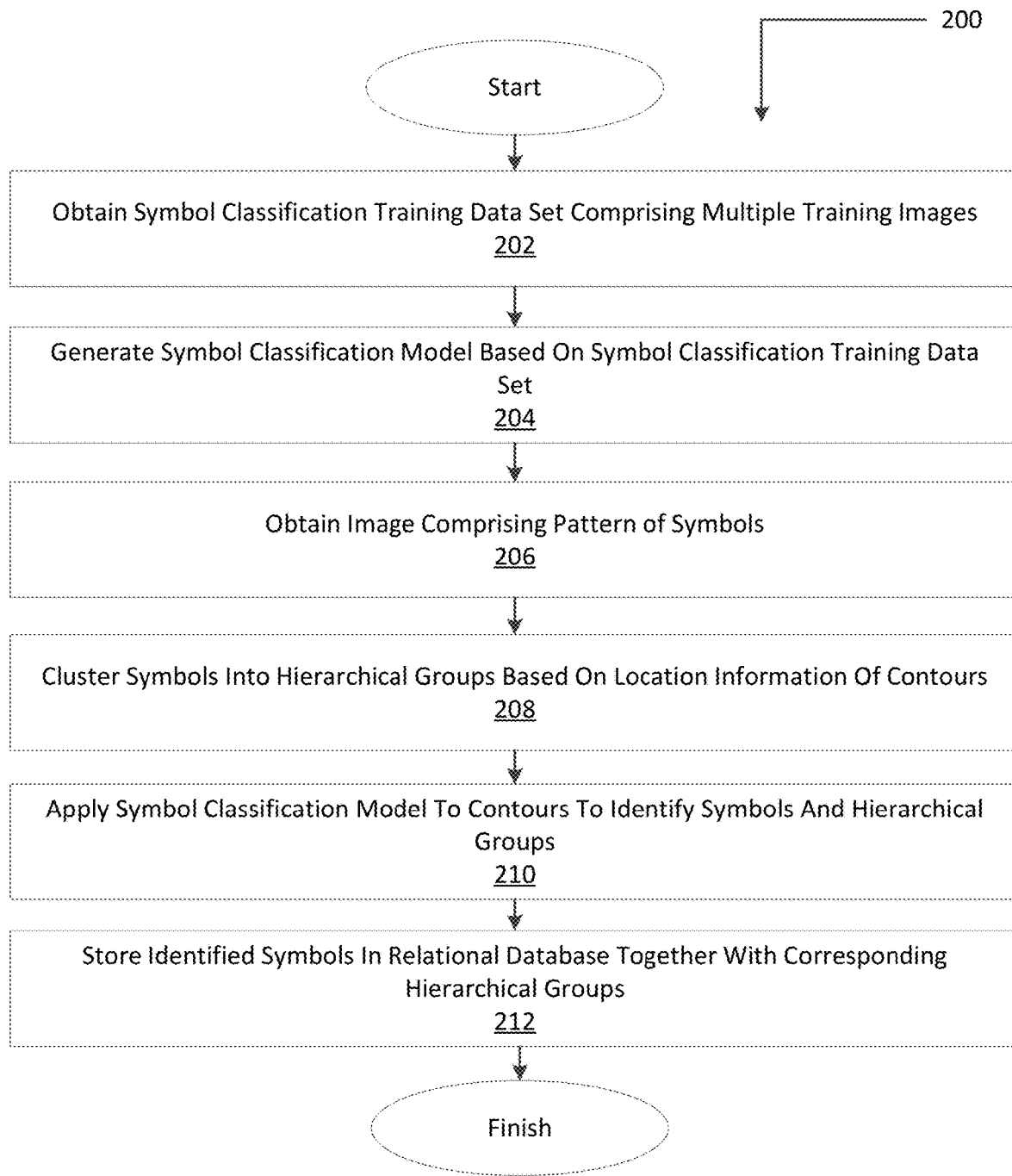
FIG. 7 illustrates a method for identifying patterns of symbols in standardized system diagrams, in accordance with one or more implementations.
Figure 8:
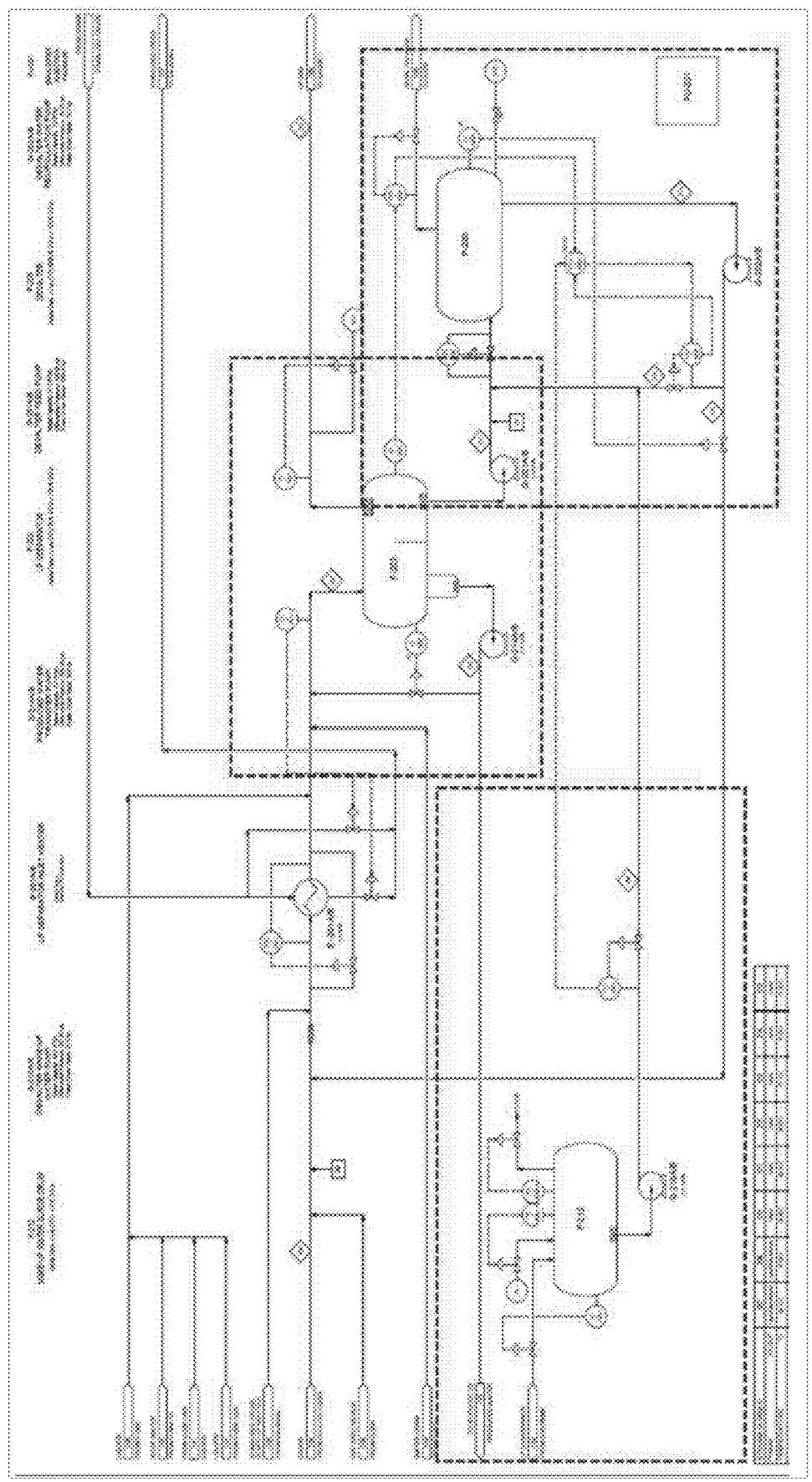
FIG. 8 is an example P&ID diagram depicting symbols, tags, and process loops.

FIG. 7 illustrates a method 200 for recognizing symbols in standardized system diagrams, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 7 and described below is not intended to be limiting.

In some implementations, method 200 may be implemented in one or more processing devices (e.g., a digital processor, an analog processor, a digital circuit designed to process information, an analog circuit designed to process information, a state machine, one or more logical circuits, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining a symbol recognition training data set including multiple training images. For example, obtaining may include generating the symbol recognition training data set, receiving the symbol recognition training data set, or any combination thereof. Operation 202 may be performed by one or more hardware processors configured by machine-readable instructions including a logical circuit that is the same as or similar to training data generation logical circuit 108, in accordance with one or more implementations.

An operation 204 may include generating a symbol recognition model based on the symbol recognition training data set. Operation 204 may output the recognized symbols along with their location information relative to the whole image, which can be represented as graph coordinate based on column and row information. Operation 204 may be performed by one or more hardware processors configured by machine-readable instructions including a module that is the same as or similar to symbol recognition logical circuit 110, in accordance with one or more implementations.

In some examples, an operation 206 may include obtaining an image including a pattern of symbols. The symbols may include one or more contours. Operation 206 may be performed by one or more hardware processors configured by machine-readable instructions including a logical circuit that is the same as or similar to image obtaining logical circuit 112, in accordance with one or more implementations.

An operation 208 may include clustering symbols into process loops or other graphical groups based on the process, physical, logical, or other relationship captured by the connection identification heuristics, e.g., as generated or obtained by the process loop identifying logical circuit 150 or connector line identifying logical circuit 154.

In some embodiments, an operation 210 may include applying the symbol recognition model to the contours to identify the symbols, process loops, and/or groups. Operation 210 may be performed by one or more hardware processors configured by machine-readable instructions including a logical circuit that is the same as or similar to symbol recognition logical circuit 110, in accordance with one or more implementations.

An operation 212 may include storing the identified symbols in a relational database together with corresponding process groups, or more generic graphical structures which consists of multiple symbols following some given relationships, e.g., electrical or physical, etc. Operation 212 may be performed by one or more hardware processors configured by machine-readable instructions including a logical circuit that is the same as or similar to symbol storing logical circuit 118, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Figure 9A:
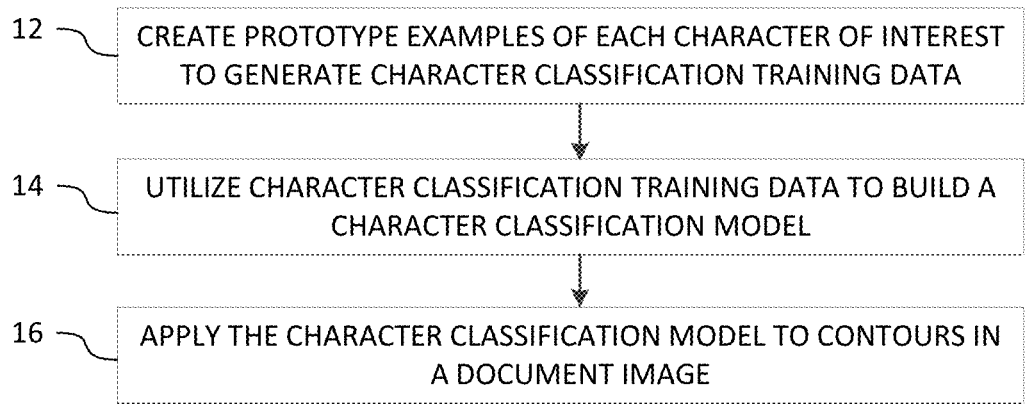
FIG. 9A is a flow chart illustrating a method for categorizing learned patterns of characters within documents, consistent with embodiments disclosed herein.

FIG. 9A is a flow chart illustrating a machine learning based method 10 for identifying character tags within document images. As depicted in FIG. 4A, method 10 may include using prototype examples of the characters and fonts of interest to programmatically generate synthetic character classification training data to enable a model to learn to classify contours in an image as characters of interest and group those characters into tags.

In some examples, a character classification model may be generated by training a convolutional neural network on character classification training data obtained from a data store or created by a programmable synthetic training data generation method. By way of example, the character classification training data may include variances of prototype characters, combination of variances of prototype characters that convey information about the characters and tags includes in a document. Thus, the character classification training data may then be used to build a model to recognize the characters of interest found in target document images.

In some examples, the method may include applying the character classification model to whitespace segmented contours in the document at step 16.

The method may include constructing tags based on the character groups derived from a hierarchical clustering algorithm.

Figure 9B:
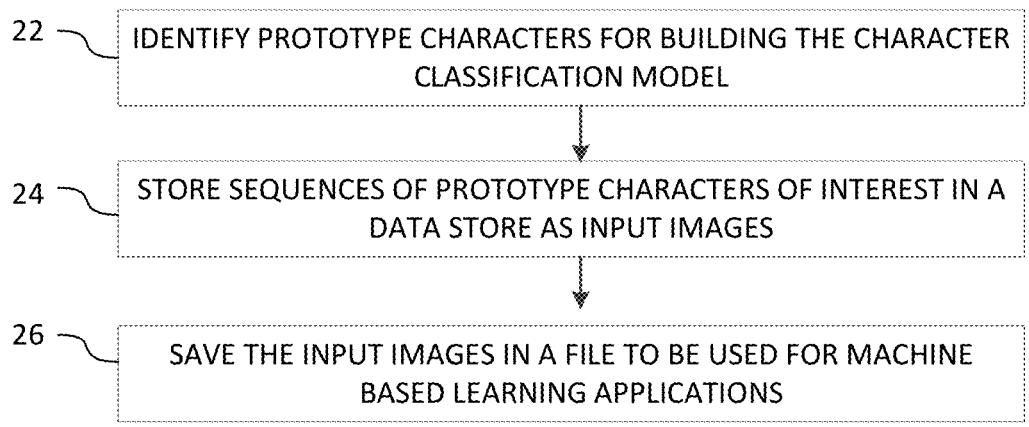
FIG. 9B is a flow chart illustrating a method for a flow chart illustrating a method classifying patterns in an image, consistent with embodiments disclosed herein.

FIG. 9B is a flow chart illustrating a method 20 for generating character classification training data to build a character classification model, consistent with embodiments disclosed herein. The character classification training data images may be created from prototype character images with different random variances in terms of shape, scale, rotation, noise level, etc. The method may also randomly combine multiple prototype characters together in order to create a bi-gram or partial bi-gram training image. In some embodiments, many documents of interest may be collected, and the characters of interest contained within those documents may be manually identified and input into a database collection. In some embodiments, the characters of interest may be prototype characters of interest generated manually or automatically by a computer processor or obtained from a data storage device.

By way of example, method 20 for building character classification training data may include creating a set prototype characters of varying fonts in a data store at step 22.

At step 24, one or more prototype characters may be positioned on a noisy background image and saved character training image. These training images may include character and/or non-character data and may be saved in TIFF, JPEG, PNG, or other image file formats.

In some examples, characters that are not of interest may be saved on a data store as training images to be classified as discards or shapes-not-of-interest. For example, lower case characters and certain symbols (e.g., "&", "#", "@", etc.) may be included as training examples to be classified as discard-characters.

In some embodiments, training images may include complete or partial combinations of prototype characters. By way of example, prototype characters of interest may include characters such as "A", "B", "C", "D", "E", "F", "G", "H", "I", "J", "K", "L", "M", "N", "O", "P", "Q", "R", "S", "T", "U", "V", "W", "X", "Y", "Z", "0", "1", "2", "3", "4", "5", "6", "7", "8", "9", "/", "(", ")", ".", ",", "-". It should be noted that any number of prototype characters or character types across many fonts may be used or implemented as building blocks for generating the character classification training data. The classes of characters included within the character classification training data may be modified or changed by deleting, modifying, or adding to the characters within the character classification training data store. Prototype characters may be generated by creating a set of character images with specified fonts or by cropping character images from actual P&ID images.

Figure 9C:
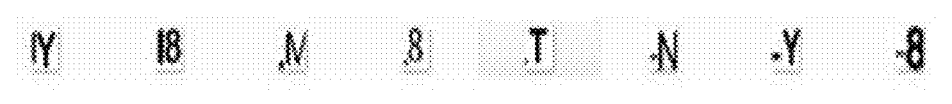

In some embodiments, two or more adjacent characters, referred to as bi-grams for two characters, tri-grams for three characters, or n-grams for n-characters, may be used as character classification training data. FIG. 9C illustrates several examples of bi-gram patterns. Using complete or partial n-grams as training images within the character classification training data may improve pattern recognition accuracy due to the fact that, within a P&ID or similar document, characters are often followed by other characters. Exemplary methods may include identifying the first character of a bi-gram by incorporating bi-grams corresponding to character touching cases to enhance the classification performance of the model. In particular, accuracy improvement may be observed in recognizing specific characters with minimal distinguishing characteristics such as dash, period, "I", etc. Training examples where such a minimally-descript character is followed by a 2nd character aides a character classification model in learning to classify such minimally-descript character. The same pattern recognition method may be applied to multiple characters (i.e., three characters for a tri-gram, and n characters for an n-gram).

Character classification training data may include a sequence of prototype characters that either includes or does not include n-grams. By way of example, the sequence of prototype characters may be exemplary labels and tags (e.g., XYZ-123) of interest sourced within the documents to be classified in a database.

Referring to FIG. 9B, the character classification training data may be used to create a character classification model as described above. By way of example, the character classification model may be trained for multiple iterations or batches. In some examples, the number of iterations may be obtained from a user interface. In some examples, the number of iterations may be based on meeting a threshold condition, for example, by gauging the accuracy of the character classification model when applied to a separate model testing dataset (i.e., not training data). The character classification model can be updated by adding misclassified character images to the training data set folder and retraining the character classification model. This process may be used to improve the accuracy of the character classification model over time given P&ID images that may contain characters that are different in font or style from the original character classification training data.

Figure 10:
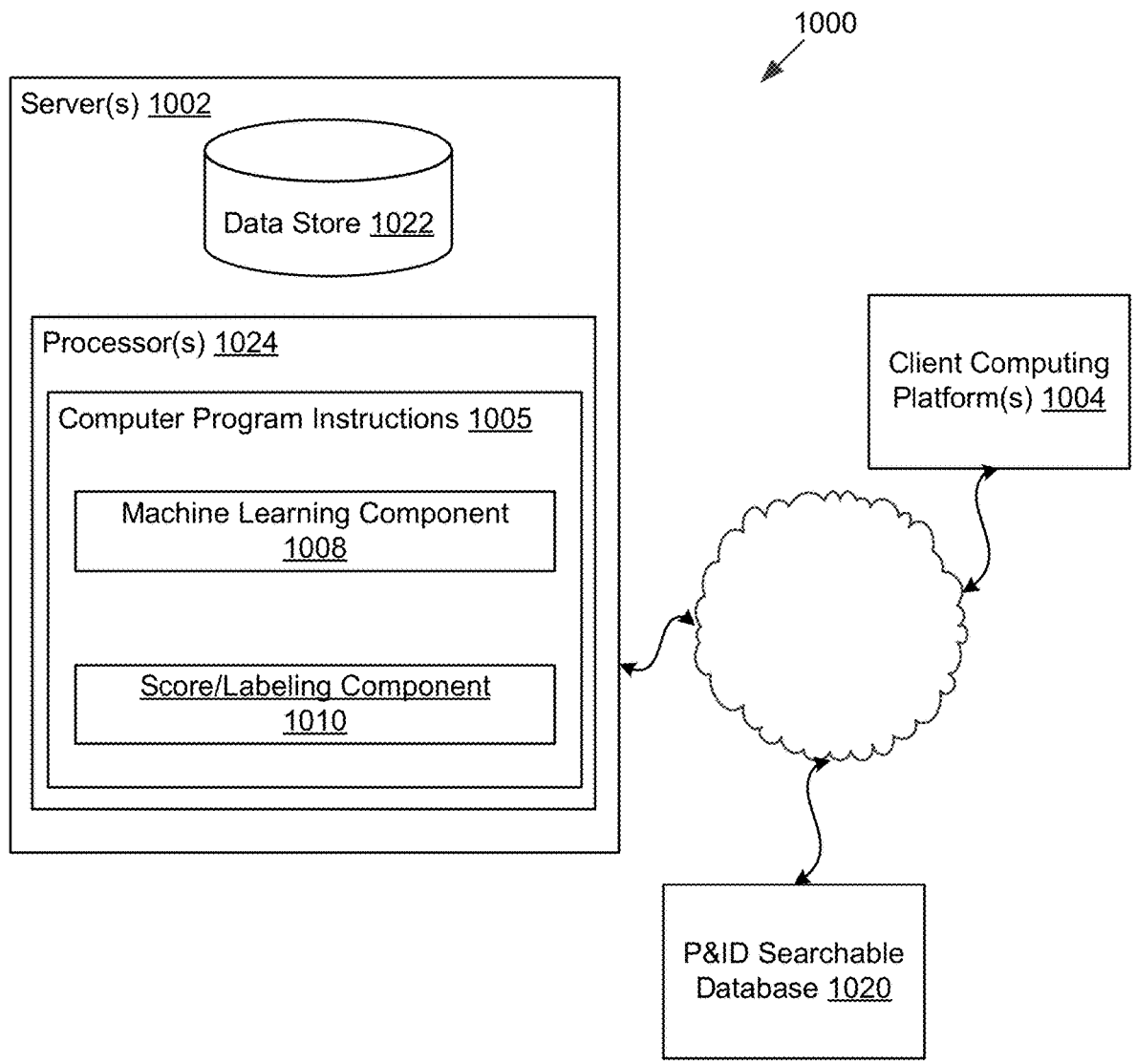
FIG. 10 is a diagram illustrating a system for categorizing learned patterns of characters, consistent with embodiments disclosed herein.

FIG. 10 illustrates an example P&ID diagram. As illustrated, the P&ID diagram includes many engineering symbols representing equipment associated together using connector lines. The connector lines may depict connectivity, e.g., through hydraulic piping, electrical connectivity, or other relationships between the equipment represented by the symbols. The P&ID diagram also includes tags identifying symbols and connectors. The dashed boxes in the P&ID diagram are shown for demonstrative purposes to indicate process loops or other relationships between various equipment (e.g., groups of equipment represented by series of connectors and symbols and connectors that represent a closed or open loop process).

Figure 9D:
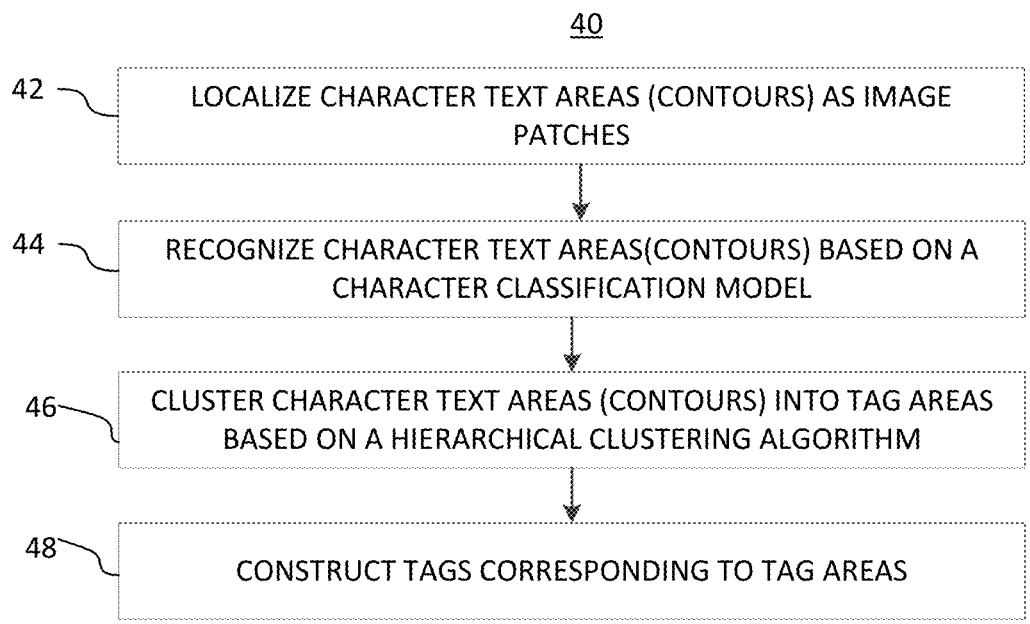
FIG. 9D is a flowchart illustrating a workflow for localizing a character area, classifying character patterns, and grouping the characters into tag groups based on the location information for the identified character areas, consistent with embodiments disclosed herein.

FIG. 9D illustrates a method 40 for recognizing the shapes of characters within a document of interest (e.g., a P&ID document) using a character classification model, grouping recognized characters together, and constructing P&ID tags from the groups of recognized characters. Thus, the contents of a document of interest may be identified, associated with a document, and may be indexed for searching purposes.

Method 40 may include identifying all whitespace-segmented contours within the document of interest. Heuristic techniques may be designed to suppress non-character contours and to resize contours that are of different scales. The contours may be identified by detecting and segmenting all connected non-whitespace pixels which are surrounded by whitespace within the image. In some examples, a boundary box may be calculated to localize the characters by taking the maximum and minimum "x" and "y" values for each contour.

Step 44 depicts using a character classification model to classify the identified contours as either characters of interest or contours which are not characters of interest. In some embodiments, the classified character contours can be grouped together based on location and used to construct tags as depicted in steps 46-47. The identified contours are grouped based on the location information of each. Other methods may be used to group related contours. After the contour groups corresponding to tag text areas are generated, a variety of heuristics are designed to add any unrecognized characters, remove the non-characters, refine the group by further separating characters or merging characters based on the character size and spacing in each localized area within the document.

Figure 9E:
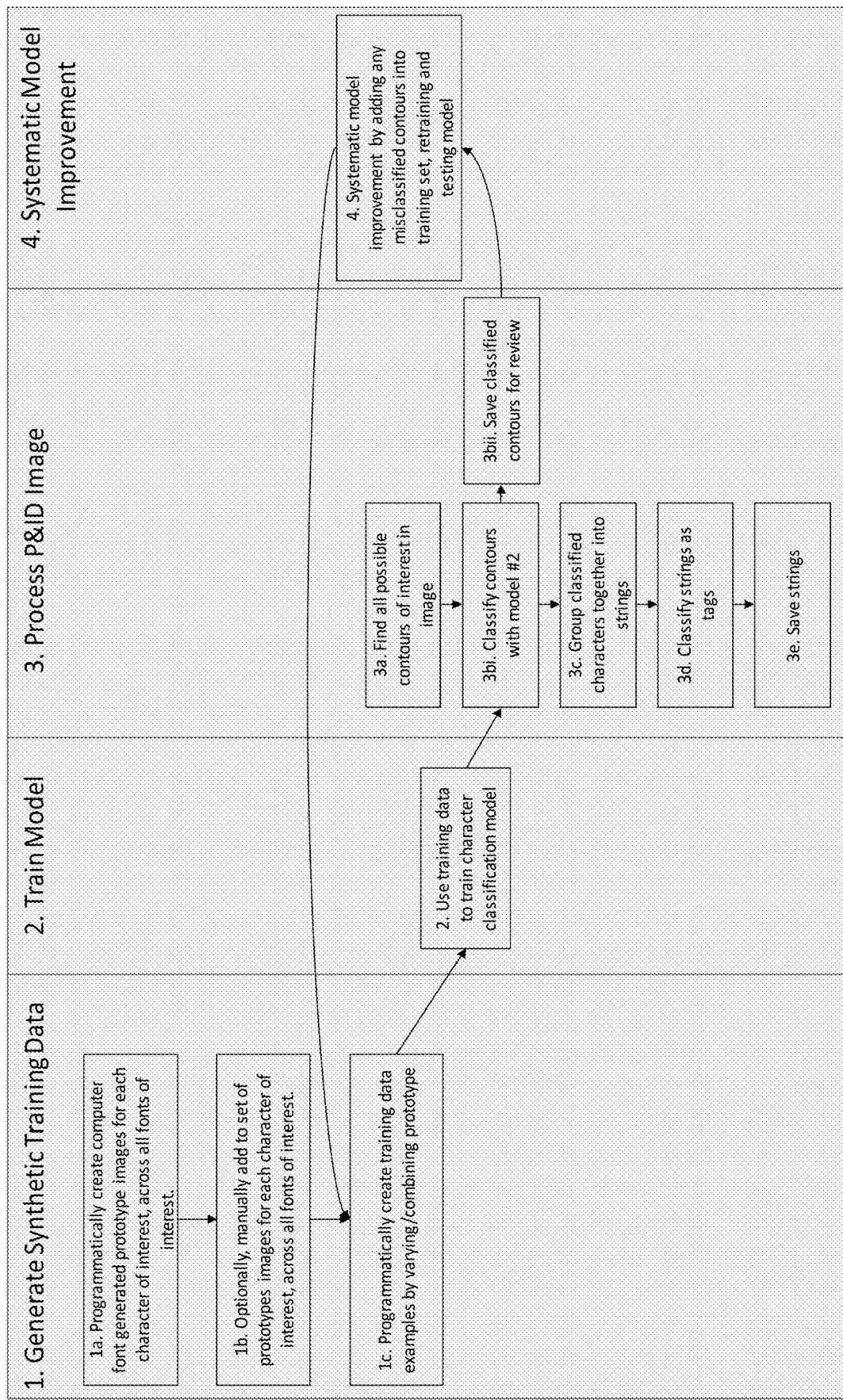
FIG. 9E describes a more detailed design of the above flowchart, and includes the modules performing synthetic data generator for character classification model, consistent with embodiments disclosed herein.

FIG. 9E is a flow chart illustrating an overall machine learning based method for identifying and classifying characters in an image and extracting tags from the image. As illustrated, this method includes generating synthetic training data via character prototypes, training a character recognition model using the synthetic training data, processing an image to extract text and/or tags. The method may also include iteratively improving the character recognition model, for example, by incorporating any misclassified characters into the training data set and updating the machine learning model.

In some examples, generating synthetic training data via prototypes includes creating computer generated prototype characters (e.g., using digitally stored fonts). In some embodiments, the method may include augmenting prototypes with manually selected examples and/or generating training data by algorithmically varying parameters such as scale, translation, and/or rotation. The method may include adding noise. In some embodiments, prototypes may be combined.

In some embodiments, a classification model is generated by training the character recognition model using training data.

In some embodiments, processing the image to extract text and/or tags may include identifying contours using white space segmentation, classifying contour sub-images with a trained classification model, and assembling or grouping classified contours. Hierarchical clustering may be used to group characters based on their proximity to each other. Various heuristics may be applied to refine text groups. In some examples, the method may include additional heuristics for identifying non-segmented contours and determining whether a string is a tag using text classification. Processing the image to extract text and/or tags may include extracting strings and/or tags for searchability such that tags are associated with a corresponding image (e.g., a P&ID document).

In some embodiments, iteratively improving the character recognition model may include augmenting training data with any misclassified contour sub-images, retraining the character recognition model, and validating the character recognition model's accuracy, e.g., using manual verification or automation using a validation data set.

FIG. 10 is a diagram illustrating a system for categorizing learned patterns of characters. For example, a system for learning patterns of characters 1000 may include one or more servers 1002, one or more client computing platforms 1004, and a searchable database 1020. The searchable database 1020 may store character classification training data, character training models, and/or documents of interest that have been reviewed and categorized based on the identification of learned patterns of characters.

Server 1002 may include one or more processors 1024 and one or more non-transitory memories with computer program instructions 1005 embedded thereon. The computer program instructions may include a machine learning component 1008 and a labeling component 1010. Server 1002 may include a data store 1022. Data store 1022 may include a database.

The machine learning component 1008 may include computer program instructions to cause processor 1024 to implement a method for categorizing learned patterns of characters. More specifically, machine learning component 1008 may cause processor 1024 to apply a deep learning process or convolution neural network to train data input in the data store 1022. The trained data may be sourced and implemented, for example. Client computing platform(s) 1004 may include desktop computers, laptop computers, tablet computers, handheld computers, smart phones, or other computing platforms capable of operating a client interface.

The score/labeling component 1010 may include computer program instructions to cause processor 1024 to implement a method for identifying the patterns of characters and associating the patterns with a score and corresponding label, the character clustering algorithms for constituting the tags, as described herein with respect to FIG. 9D. The documents, indexed with the listed of identified tags may then be input in the P&ID searchable database 1020.

As will be appreciated, the method as described herein may be performed using a computing system having machine executable instructions stored on a tangible medium. The instructions are executable to perform each portion of the method, either autonomously, or with the assistance of input from an operator.

Those skilled in the art will appreciate that the disclosed embodiments described herein are by way of example only, and that numerous variations will exist. The invention is limited only by the claims, which encompass the embodiments described herein as well as variants apparent to those skilled in the art. In addition, it should be appreciated that structural features or method steps shown or described in any one embodiment herein can be used in other embodiments as well.

Figure 11:
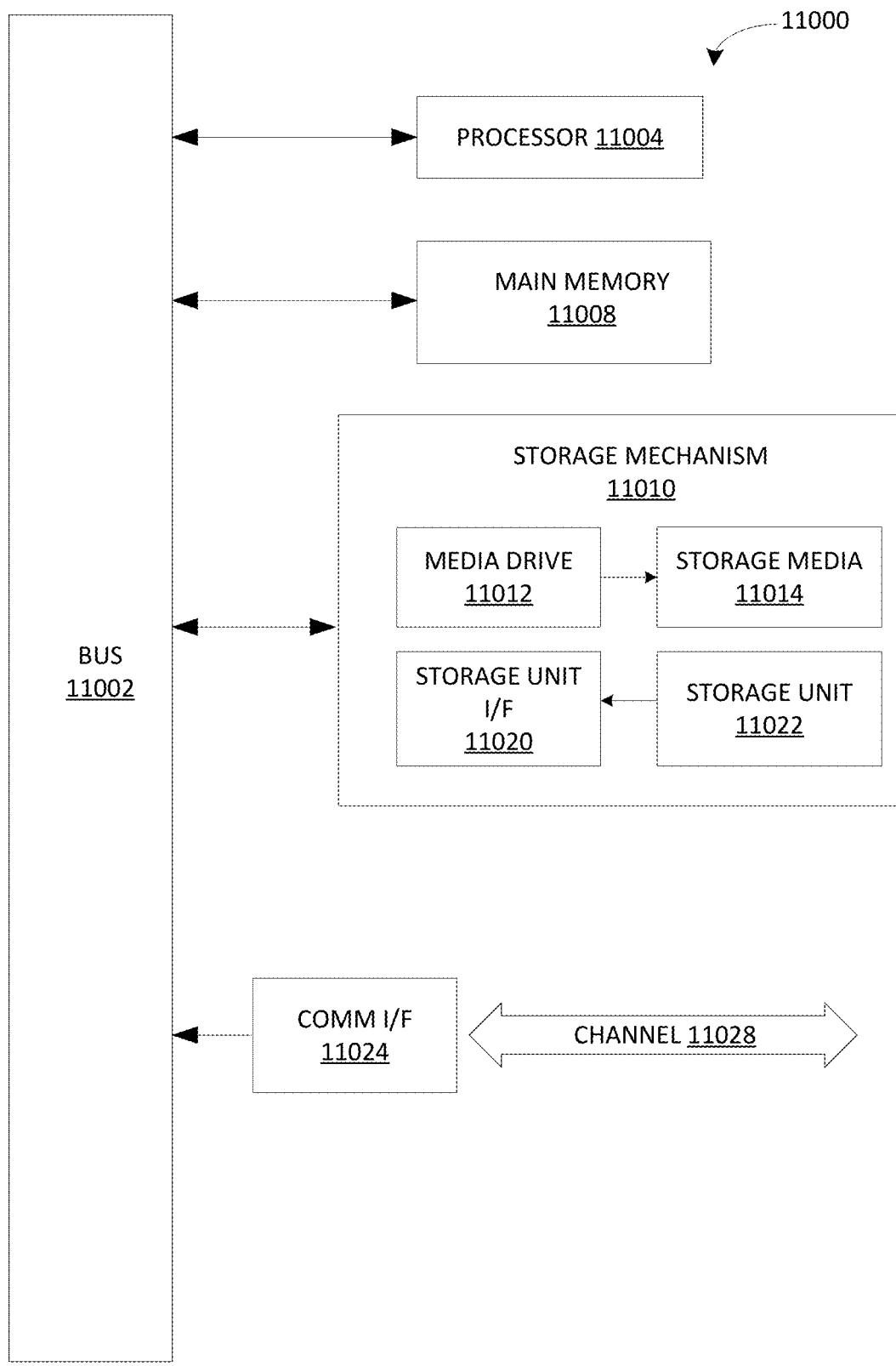
FIG. 11 illustrates an example computing system that may be used in implementing various features of embodiments of the disclosed technology.

As used herein, the terms logical circuit and component might describe a given unit of functionality that can be performed in accordance with one or more embodiments of the technology disclosed herein. As used herein, either a logical circuit or a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components, logical circuits, or components of the technology are implemented in whole or in part using software, in one embodiment, these software elements can be implemented to operate with a computing or logical circuit capable of carrying out the functionality described with respect thereto. One such example logical circuit is shown in FIG. 11. Various embodiments are described in terms of this example logical circuit 11000. After reading this description, it will become apparent to a person skilled in the relevant art how to implement the technology using other logical circuits or architectures.

Referring now to FIG. 11, computing system 11000 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Logical circuit 11000 might represent computing capabilities embedded within or otherwise available to a given device. For example, a logical circuit might be found in other electronic devices such as, for example, digital cameras, navigation systems, cellular telephones, portable computing devices, modems, routers, WAPs, terminals and other electronic devices that might include some form of processing capability.

Computing system 11000 might include, for example, one or more processors, controllers, control components, or other processing devices, such as a processor 11004. Processor 11004 might be implemented using a general-purpose or special-purpose processing component such as, for example, a microprocessor, controller, or other control logic. In the illustrated example, processor 11004 is connected to a bus 11002, although any communication medium can be used to facilitate interaction with other components of logical circuit 11000 or to communicate externally.

Computing system 11000 might include one or more memory components, simply referred to herein as main memory 11008. For example, preferably random access memory (RAM) or other dynamic memory, might be used for storing information and instructions to be executed by processor 11004. Main memory 11008 might be used for storing temporary variables or other intermediate information during execution of instructions to be executed by processor 11004. Logical circuit 11000 might likewise include a read only memory ("ROM") or other static storage device coupled to bus 11002 for storing static information and instructions for processor 11004.

The computing system 11000 might include one or more various forms of information storage mechanism 11010, which might include, for example, a media drive 11012 and a storage unit interface 11020. The media drive 11012 might include a drive or other mechanism to support fixed or removable storage media 11014. For example, a hard disk drive, a floppy disk drive, a magnetic tape drive, an optical disk drive, a CD or DVD drive (R or RW), or other removable or fixed media drive might be provided. Accordingly, storage media 11014 might include, for example, a hard disk, a floppy disk, magnetic tape, cartridge, optical disk, a CD or DVD, or other fixed or removable medium that is read by, written to or accessed by media drive 11012. As these examples illustrate, the storage media 11014 can include a computer usable storage medium having stored therein computer software or data.

In alternative embodiments, information storage mechanism 11010 might include other similar instrumentalities for allowing computer programs or other instructions or data to be loaded into logical circuit 11000. Such instrumentalities might include, for example, a fixed or removable storage unit 11022 and an interface 11020. Examples of such storage units 11022 and interfaces 11020 can include a program cartridge and cartridge interface, a removable memory (for example, a flash memory or other removable memory component) and memory slot, a PCMCIA slot and card, and other fixed or removable storage units 11022 and interfaces 11020 that allow software and data to be transferred from the storage unit 11022 to logical circuit 11000.

Logical circuit 11000 might include a communications interface 11024. Communications interface 11024 might be used to allow software and data to be transferred between logical circuit 11000 and external devices. Examples of communications interface 11024 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 11024 might typically be carried on signals, which can be electronic, electromagnetic (which includes optical) or other signals capable of being exchanged by a given communications interface 11024. These signals might be provided to communications interface 11024 via a channel 11028. This channel 11028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 11008, storage unit 11020, media 11014, and channel 11028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the logical circuit 11000 to perform features or functions of the disclosed technology as discussed herein.

Although FIG. 11 depicts a computer network, it is understood that the disclosure is not limited to operation with a computer network, but rather, the disclosure may be practiced in any suitable electronic device. Accordingly, the computer network depicted in FIG. 11 is for illustrative purposes only and thus is not meant to limit the disclosure in any respect.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions.

Additionally, regarding flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for identifying patterns of symbols in standardized system diagrams, the system comprising:
   one or more logical circuits configured by machine-readable instructions to:
   obtain a symbol recognition training data set comprising multiple training images comprising multiple symbols;
   generate a symbol recognition model based on the symbol recognition training data set;
   determine, with a process loop identifying logical circuit, connection relationships between adjacent symbols within a subset of the multiple symbols and assigning logical descriptors based on the connection relationships;
   group the subset of the multiple symbols into one or more graphical structures together with corresponding logical descriptors;
   identify, with a symbol recognition logical circuit, recognized symbols of the subset of the multiple symbols and
   store the recognized symbols in a relational database together with the corresponding logical descriptors;
   identify process loops in the images corresponding to related groups of symbols;
   identify a first symbol of interest within the image corresponding to a component of interest known to belong to one of the process loops;
   initiate a graph traversing process with the first identified symbol as a starting point:
   identify a connector line extending from the first symbol of interest;
   identify a second symbol of interest coupled to the first connector line;

identify a second connector line extending from the second symbol of interest; and store the identified connectors and corresponding symbols of interest together in the relational database.

2. The system of claim 1, wherein the one or more logical circuits are further configured by machine-readable instructions to synthetically generate the training data set.

3. The system of claim 1, wherein the one or more logical circuits are further configured by machine-readable instructions to:

create prototype symbols of interest; and store the prototype symbols of interest in a data store as templates for programmatically creating varied training images.

4. The system of claim 3, wherein the one or more logical circuits are further configured by machine-readable instructions to:

generate a first array of symbol location regions within the image;

determine, with the symbol recognition model, a probability that a symbol location region of the first array comprises a symbol of interest;

generate a second array comprising symbol location regions for which the probability that a symbol location region of the first array comprises a symbol of interest exceeds a selected threshold value;

apply a pattern recognition process to the symbol location regions of the second array to identify corresponding symbols of interest; and store the corresponding symbols of interest in the relational database.

5. The system of claim 4, wherein the one or more logical circuits are further configured by machine-readable instructions to:

determine a probability that a symbol location region of the first array comprises a symbol of interest by evaluating if related symbols of interest are present in any adjacent symbol location region.

6. The system of claim 5, wherein the one or more logical circuits are further configured by machine-readable instructions to evaluate the symbol location regions in a sequential order.

7. The system of claim 1, wherein the images comprise standardized system diagrams.

8. The system of claim 1, wherein the symbol classification training data comprises a set standardized system diagrams comprising corresponding sets of symbols and hierarchical groups and manually identifying the symbols and hierarchical groups using a graphical user interface.

9. The system of claim 8, wherein obtaining the symbol classification training data further comprises modifying a size, translation, rotation, or other possible variances of the prototype symbols of interest.

10. The system of claim 8, wherein the one or more logical circuits are further configured by machine-readable instructions to obtain the training data by applying a noise pattern to one or more images.

11. The system of claim 10, wherein the one or more logical circuits are further configured by machine-readable instructions to obtain the noise pattern from the relational database.

12. The system of claim 10, wherein the one or more logical circuits are further configured by machine-readable instructions to generate the noise pattern using a Generative Adversarial Net (GAN).

13. The system of claim 1, wherein the symbol recognition model comprises a machine learning algorithm.

14. The system of claim 13, wherein the machine learning algorithm is a convolutional-based neural network or its variances for image recognition tasks.

15. The system of claim 1, wherein the one or more logical circuits are further configured by machine-readable instructions to identify standardized system diagram tags corresponding to the symbols and storing the identified standardized system diagram tags in the relational database together with the corresponding symbols.

16. The system of claim 15, wherein the one or more logical circuits are further configured by machine-readable instructions to:

obtain or synthetically generate a character classification training data;

generate a character classification model based on the character classification training data;

identify and classify character contours within the images;

cluster the characters into character hierarchical clusters based on the location information of the character contours; and store the grouped characters as tags or labels in a relational database.

17. The system of claim 16, wherein the one or more logical circuits are further configured by machine-readable instructions to segment the image and apply heuristics to the image to suppress non-character contours and identify and classify character contours.

18. The system of claim 1, wherein the one or more logical circuits are further configured by machine-readable instructions to identify additional connector lines extending from corresponding symbols of interest until a terminating connector line is identified to couple back into the first symbol of interest, such that the identified connector lines and corresponding symbols of interest form a closed loop.

19. The system of claim 18, wherein the one or more logical circuits are further configured by machine-readable instructions to identify the connector lines using an edge detection process.

20. The system of claim 18, wherein the one or more logical circuits are further configured by machine-readable instructions to verify, with a graphical user interface, the identified loops.

21. The system of claim 1, wherein the identified process loop encodes a chemical process, a physical process, or a control process.

22. The system of claim 1, wherein the one or more logical circuits are further configured by machine-readable instructions to store corresponding tags together in relation to corresponding standardized system diagrams within the relational database.

23. The system of claim 22, wherein the relational database is searchable from a graphical user interface.

24. A method for identifying patterns of symbols in standardized system diagrams, the method comprising:

obtaining a symbol recognition training data set comprising multiple training images comprising multiple symbols;

generating a symbol recognition model based on the symbol recognition training data set;

determining, with a process loop identifying logical circuit, connection relationships between adjacent symbols within a subset of the multiple symbols and assigning logical descriptors based on the connection relationships;

grouping the subset of the multiple symbols into one or more graphical structures together with corresponding logical descriptors;

identifying, with a symbol recognition logical circuit, recognized symbols of the subset of the multiple symbols;

storing the recognized symbols in a relational database together with corresponding logical descriptors;

identifying process loops in the images corresponding to related groups of symbols;

identifying a first symbol of interest within the image corresponding to a component of interest known to belong to one of the process loops;

initiating a graph traversing process with the first identified symbol as a starting point:

identifying a connector line extending from the first symbol of interest;

identifying a second symbol of interest coupled to the first connector line;

identifying a second connector line extending from the second symbol of interest; and storing the identified connectors and corresponding symbols of interest together in the relational database.

25. The method of claim 24, further comprising synthetically generating the symbol recognition training set.

26. The method of claim 25, further comprising:

creating prototype symbols of interest; and storing the prototype symbols of interest in a data store as templates for programmatically creating varied training images.

27. The method of claim 26, further comprising evaluating the symbol location regions in a sequential order.

28. The method of claim 26, wherein the images comprise standardized system diagrams.

29. The method of claim 26, wherein the symbol recognition training data comprises a set standardized system diagrams comprising corresponding sets of symbols and hierarchical groups and manually identifying the symbols and hierarchical groups using a graphical user interface.

30. The method of claim 29, wherein obtaining the symbol recognition training data further comprises modifying a size, translation, rotation, or other possible variances of the prototype symbols of interest.

31. The method of claim 29, further comprising obtaining the training data by applying a noise pattern to one or more images.

32. The method of claim 31, further comprising obtaining the noise pattern from the relational database.

33. The method of claim 31, further comprising generating the noise pattern using a Generative Adversarial Net (GAN).

34. The method of claim 24, wherein the symbol recognition model comprises a machine learning algorithm.

35. The method of claim 34, wherein the machine learning algorithm is a convolutional-based neural network and its variances for image recognition tasks.

36. The method of claim 24, further comprising:

generating a first array of symbol location regions within the image;

determining, with the symbol classification model, a probability that a symbol location region of the first array comprises a symbol of interest;

generating a second array comprising symbol location regions for which the probability that a symbol location region of the first array comprises a symbol of interest exceeds a selected threshold value;

applying a pattern recognition process to the symbol location regions of the second array to identify corresponding symbols of interest; and storing the corresponding symbols of interest in the relational database.

37. The method of claim 24, further comprising:

determining a probability that a symbol location region of the first array comprises a symbol of interest by evaluating if related symbols of interest are present in any adjacent symbol location region.

38. The method of claim 24, further comprising identifying standardized system diagram tags corresponding to the symbols and storing the identified standardized system diagram tags in the relational database together with the corresponding symbols.

39. The method of claim 38, further comprising:

obtaining or synthetically generating a character classification training data;

generating a character classification model based on the character classification training data;

identifying character contours within the images;

clustering the characters into character hierarchical clusters based on the location information of the character contours;

applying the character classification model to the character contours to identify the characters and character hierarchical clusters; and storing the identified characters in a relational database together with corresponding character hierarchical clusters.

40. The method of claim 39, further comprising segmenting the image and applying heuristics to the image to suppress non-character contours and identify character contours.

41. The method of claim 24, further comprising identifying additional connector lines extending from corresponding symbols of interest until a terminating connector line is identified to couple back into the first symbol of interest, such that the identified connector lines and corresponding symbols of interest form a closed loop.

42. The method of claim 24, further comprising identifying the connector lines using an edge detection process.

43. The method of claim 42, further comprising verifying, with a graphical user interface, the identified loops.

44. The method of claim 24, wherein the identified process loop encodes a chemical process, a physical process, or a control process.

45. The method of claim 24, wherein identified process loops, identified symbols of interest, and corresponding tags are stored together in relation to corresponding standardized system diagrams within the relational database.

46. The method of claim 45, wherein the relational database is searchable from a graphical user interface.

47. A method for identifying patterns of symbols in standardized system diagrams, the method comprising:

obtaining a symbol recognition training data set comprising multiple training images comprising multiple symbols;

generating a symbol recognition model based on the symbol recognition training data set;

determining, with a process loop identifying logical circuit, connection relationships between adjacent symbols within a subset of the multiple symbols and assigning logical descriptors based on the connection relationships;

grouping the subset of the multiple symbols into one or more graphical structures together with corresponding logical descriptors;

identifying, with a symbol recognition logical circuit, recognized symbols of the subset of the multiple symbols;

storing the recognized symbols in a relational database together with corresponding logical descriptors;

generating a first array of symbol location regions within the image;

determining, with the symbol recognition model, a probability that a symbol location region of the first array comprises a symbol of interest;

generating a second array comprising symbol location regions for which the probability that a symbol location region of the first array comprises a symbol of interest exceeds a selected threshold value;

applying a pattern recognition process to the symbol location regions of the second array to identify corresponding symbols of interest; and storing the corresponding symbols of interest in the relational database.

48. The method of claim 47, further comprising identifying process loops in the images corresponding to related groups of symbols.

49. The method of claim 48, further comprising:

identifying a first symbol of interest within the image corresponding to a component of interest known to belong to one of the process loops;

initiating a graph traversing process with the first identified symbol as a starting point:

identifying a connector line extending from the first symbol of interest;

identifying a second symbol of interest coupled to the first connector line;

identifying a second connector line extending from the second symbol of interest; and storing the identified connectors and corresponding symbols of interest together in the relational database.

\* \* \* \* \*